US008892408B2

(12) United States Patent
Sturdza et al.

(10) Patent No.: US 8,892,408 B2
(45) Date of Patent: *Nov. 18, 2014

(54) GENERATING INVISCID AND VISCOUS FLUID FLOW SIMULATIONS OVER A SURFACE USING A QUASI-SIMULTANEOUS TECHNIQUE

(75) Inventors: Peter Sturdza, Redwood City, CA (US); Herve Martins-Rivas, Mountain View, CA (US); Yoshifumi Suzuki, Mountain View, CA (US)

(73) Assignee: Aerion Corporation, Reno, NV (US)

( * ) Notice: Subject to any disclaimer, the term of this patent is extended or adjusted under 35 U.S.C. 154(b) by 833 days.

This patent is subject to a terminal disclaimer.

(21) Appl. No.: 13/070,384

(22) Filed: Mar. 23, 2011

(65) Prior Publication Data

US 2012/0245903 A1   Sep. 27, 2012

(51) Int. Cl.
*G06F 7/60* (2006.01)
*G06F 17/10* (2006.01)
*G06F 17/50* (2006.01)

(52) U.S. Cl.
CPC ........ *G06F 17/5018* (2013.01); *G06F 2217/16* (2013.01)
USPC .......................................................... 703/2

(58) Field of Classification Search
USPC .......................................................... 703/2
See application file for complete search history.

(56) References Cited

U.S. PATENT DOCUMENTS

| | | | |
|---|---|---|---|
| 5,544,524 A | 8/1996 | Huyer et al. | |
| 5,901,928 A | 5/1999 | Raskob, Jr. | |
| 5,926,399 A | 7/1999 | Berkooz et al. | |
| 6,445,390 B1 | 9/2002 | Aftosmis et al. | |
| 6,516,652 B1 | 2/2003 | May et al. | |
| 7,054,768 B2 | 5/2006 | Anderson | |
| 7,243,057 B2 | 7/2007 | Houston et al. | |
| 7,251,592 B1 | 7/2007 | Praisner et al. | |
| 7,430,500 B2 | 9/2008 | Lei et al. | |
| 7,565,276 B2 | 7/2009 | Song et al. | |
| 7,813,907 B2 | 10/2010 | Zhang et al. | |
| 7,880,883 B2 | 2/2011 | Okcay et al. | |
| 7,912,681 B2 | 3/2011 | Narramore et al. | |
| 7,921,002 B2 | 4/2011 | Kamatsuchi | |

(Continued)

OTHER PUBLICATIONS

International Search Report and Written Opinion received for PCT Patent Application No. PCT/US2012/28606, mailed on Jun. 1, 2012, 11 pages.

(Continued)

*Primary Examiner* — Saif Alhija
(74) *Attorney, Agent, or Firm* — Morrison & Foerster LLP

(57) ABSTRACT

A fluid-flow simulation over a computer-generated surface is generated using a quasi-simultaneous technique. The simulation includes a fluid-flow mesh of inviscid and boundary-layer fluid cells. An initial fluid property for an inviscid fluid cell is determined using an inviscid fluid simulation that does not simulate fluid viscous effects. An initial boundary-layer fluid property a boundary-layer fluid cell is determined using the initial fluid property and a viscous fluid simulation that simulates fluid viscous effects. An updated boundary-layer fluid property is determined for the boundary-layer fluid cell using the initial fluid property, initial boundary-layer fluid property, and an interaction law. The interaction law approximates the inviscid fluid simulation using a matrix of aerodynamic influence coefficients computed using a two-dimensional surface panel technique and a fluid-property vector. An updated fluid property is determined for the inviscid fluid cell using the updated boundary-layer fluid property.

24 Claims, 9 Drawing Sheets

(56) References Cited

U.S. PATENT DOCUMENTS

| | | | |
|---|---|---|---|
| 8,115,766 | B2 | 2/2012 | Svakhine et al. |
| 8,259,104 | B2 | 9/2012 | Pirzadeh et al. |
| 2004/0138853 | A1 | 7/2004 | Tanahashi et al. |
| 2004/0167757 | A1 | 8/2004 | Struijs |
| 2005/0098685 | A1 | 5/2005 | Segota et al. |
| 2005/0246110 | A1 | 11/2005 | van Dam et al. |
| 2006/0025973 | A1 | 2/2006 | Kim |
| 2007/0034746 | A1* | 2/2007 | Shmilovich et al. .......... 244/207 |
| 2008/0061192 | A1 | 3/2008 | Sullivan |
| 2008/0163949 | A1 | 7/2008 | Duggleby et al. |
| 2008/0177511 | A1 | 7/2008 | Kamatsuchi |
| 2008/0300835 | A1 | 12/2008 | Hixon |
| 2009/0065631 | A1 | 3/2009 | Zha |
| 2009/0142234 | A1 | 6/2009 | Tatarchuk et al. |
| 2009/0171596 | A1 | 7/2009 | Houston |
| 2009/0171633 | A1 | 7/2009 | Aparicio Duran et al. |
| 2009/0234595 | A1 | 9/2009 | Okcay et al. |
| 2009/0312990 | A1 | 12/2009 | Fouce et al. |
| 2010/0036648 | A1 | 2/2010 | Mangalam et al. |
| 2010/0250205 | A1 | 9/2010 | Velazquez Lopez et al. |
| 2010/0268517 | A1 | 10/2010 | Calmels |
| 2010/0276940 | A1 | 11/2010 | Khavari et al. |
| 2010/0280802 | A1 | 11/2010 | Calmels |
| 2010/0305925 | A1 | 12/2010 | Sendhoff et al. |
| 2011/0288834 | A1 | 11/2011 | Yamazaki et al. |
| 2012/0065950 | A1 | 3/2012 | Lu |

OTHER PUBLICATIONS

International Search Report and Written Opinion received for PCT Patent Application No. PCT/US2012/030427, mailed on Jun. 20, 2012, 9 pages.
International Search Report and Written Opinion received for PCT Patent Application No. PCT/US2012/030189, mailed on Jun. 20, 2012, 7 pages.
Non Final Office Action received for U.S. Appl. No. 12/982,744, mailed on Oct. 2, 2012, 21 pages.
Notice of Allowance received for U.S. Appl. No. 13/046,469, mailed on Jan. 10, 2013, 19 pages.
Notice of Allowance received for U.S. Appl. No. 12/982,744, mailed on Feb. 5, 2013, 8 pages.
Allison et al., "Static Aeroelastic Predictions for a Transonic Transport Model using an Unstructured-Grid Flow Solver Coupled with a Structural Plate Technique", NASA/TP-2003-212156, Mar. 2003, 49 pages.
"Chapter 3: Numerical Simulation of Flows past Bluff Bodies", 2001, pp. 6-19.
Frink et al., "An Unstructured-Grid Software System for Solving Complex Aerodynamic Problems", NASA, 1995, pp. 289-308.
Kravtsova et al., "An Effective Numerical Method for Solving Viscous-Inviscid Interaction Problems", Philosophical Transactions of the Royal Society A, vol. 363, May 15, 2005, pp. 1157-1167.
Lagree, P. Y., "Interactive Boundary Layer [IBL] or Inviscid-Viscous Interactions [IVI or VII]", Dec. 14, 2009, pp. 1-29.
Mavriplis, Dimitri J., "Aerodynamic Drag Prediction using Unstructured Mesh Solvers", National Institute of Aerospace 144 Research Drive, Hampton, VA 23666, U.S., 2003, pp. 1-83.
May et al., "Unstructured Algorithms for Inviscid and Viscous Flows Embedded in a Unified Solver Architecture: Flo3xx", 43rd Aerospace Sciences Meeting and Exhibit, American Institute of Aeronautics and Astronautics Paper 2005-0318, Reno, NV, Jan. 10-13, 2005, pp. 1-15.
Neel, Reece E., "Advances in Computational Fluid Dynamics: Turbulent Separated Flows and Transonic Potential Flows", Aug. 1997, 272 pages.
Smith et al., "Interpolation and Gridding of Aliased Geophysical Data using Constrained Anisotropic Diffusion to Enhance Trends", SEG International Exposition and 74th Annual Meeting, Denver, Colorado, Oct. 10-15, 2004, 4 pages.
Veldmann et al., "Interaction Laws in Viscous-Inviscid Coupling", 2004, pp. 225-232.
Weickert et al., "Tensor Field Interpolation with PDEs", Universität des Saarlandes, 2005, 17 pages.
Notice of Allowance received for U.S. Appl. No. 13/069,374, mailed on May 15, 2013, 23 pages.
Davis et al., "Control of Aerodynamic Flow", AFRL-VA-WP-TR-2005-3130, Delivery Order 0051: Transition Prediction Method Review Summary for the Rapid Assessment Tool for Transition Prediction (RATTraP), Jun. 2005, 95 pages.
Herbert, Thorwald, "Parabolized Stability Equations", Annual Review of Fluid Mechanics, vol. 29, 1997, pp. 245-283.
Jones et al., "Direct Numerical Simulations of Forced and Unforced Separation Bubbles on an Airfoil at Incidence", Journal of Fluid Mechanics, vol. 602, 2008, pp. 175-207.
Khorrami et al., "Linear and Nonlinear Evolution of Disturbances in Supersonic Streamwise Vortices", High Technology Corporation, 1997, 87 pages.
Matsumura, Shin, "Streamwise Vortex Instability and Hypersonic Boundary Layer Transition on the Hyper 2000", Purdue University, Aug. 2003, 173 pages.
Tsao et al., "Application of Triple Deck Theory to the Prediction of Glaze Ice Roughness Formation on an Airfoil Leading Edge", Computers & Fluids, vol. 31, 2002, pp. 977-1014.
International Search Report and Written Opinion received for PCT Patent Application No. PCT/US2011/67917, mailed on May 1, 2012, 10 pages.
Crouch et al., "Transition Prediction for Three-Dimensional Boundary Layers in Computational Fluid Dynamics Applications", AIAA Journal, vol. 40, No. 8, Aug. 2002, pp. 1536-1541.
Dagenhart, J. Ray, "Amplified Crossflow Disturbances in the Laminar Boundary Layer on Swept Wings with Suction", NASA Technical Paper 1902, Nov. 1981, 91 pages.
Drela, Mark, "Implicit Implementation of the Full en Transition Criterion", American Institute of Aeronautics and Astronautics Paper 03-4066, Jun. 23-26, 2003, pp. 1-8.
Drela, Mark, "Two-Dimensional Transonic Aerodynamic Design and Analysis Using the Euler Equations", Ph.D. thesis, Massachusetts Institute of Technology, Dec. 1985, pp. 1-159.
Fuller et al., "Neural Network Estimation of Disturbance Growth Using a Linear Stability Numerical Model", American Institute of Aeronautics and Astronautics, Inc., Jan. 6-9, 1997, pp. 1-9.
Gaster, M., "Rapid Estimation of N-Factors for Transition Prediction", 13th Australasian Fluid Mechanics Conference, Dec. 13-18, 1998, pp. 841-844.
Gleyzes et al., "A Calculation Method of Leading-Edge Separation Bubbles", Numerical and Physical Aspects of Aerodynamic Flows II, 1984, pp. 173-192.
Krumbein, Andreas, "Automatic Transition Prediction and Application to Three-Dimensional Wing Configurations", Journal of Aircraft, vol. 44, No. 1, Jan.-Feb. 2007, pp. 119-133.
Langlois et al., "Automated Method for Transition Prediction on Wings in Transonic Flows", Journal of Aircraft, vol. 39, No. 3, May-Jun. 2002, pp. 460-468.
Perraud et al., "Automatic Transition Predictions Using Simplified Methods", AIAA Journal, vol. 47, No. 11, Nov. 2009, pp. 2676-2684.
Rasmussen et al., "Gaussian Processes for Machine Learning", MIT Press, 2006, 266 pages.
Stock et al., "A Simplified en Method for Transition Prediction in Two-Dimensional, Incompressible Boundary Layers", Journal of Flight Sciences and Space Research, vol. 13, 1989, pp. 16-30.
Sturdza, Peter, "An Aerodynamic Design Method for Supersonic Natural Laminar Flow Aircraft", Stanford University, Dec. 2003, 198 pages.
Washburn, Anthony, "Drag Reduction Status and Plans—Laminar Flow and AFC", AIAA Aero Sciences Meeting, Jan. 4-7, 2011, pp. 1-25.
Lock et al., "Viscous-Inviscid Interactions in External Aerodynamics", Progress in Aerospace Sciences, vol. 24, 1987, pp. 51-171.
Aftosmis et al., "Applications of a Cartesian Mesh Boundary-Layer Approach for Complex Configurations", 44th AIAA Aerospace Sciences Meeting, Reno NV, Jan. 9-12, 2006, pp. 1-19.
Jespersen et al., "Recent Enhancements to Overflow", AIAA 97-0644, 1997, pp. 1-17.

(56) References Cited

OTHER PUBLICATIONS

Drela, Mark, "XFOIL: An Analysis and Design System for Low Reynolds Number Airfoils", Proceedings of the Conference on Low Reynolds Number Aerodynamics, 1989, pp. 1-12.

Bartels et al., "CFL3D Version 6.4—General Usage and Aeroelastic Analysis", NASA/TM-2006-214301, Apr. 2006, 269 pages.

Eymard et al., "Discretization Schemes for Heterogeneous and Anisotropic Diffusion Problems on General Nonconforming Meshes", Available online as HAL report 00203269, Jan. 22, 2008, pp. 1-28.

Balay et al., "PETSc Users Manual", ANL-95/11, Revision 3.1, Mar. 2010, pp. 1-189.

Spreiter et al., "Thin Airfoil Theory Based on Approximate Solution of the Transonic Flow Equation", Report 1359—National Advisory Committee for Aeronautics, 1957, pp. 509-545.

Hess et al., "Calculation of Potential Flow About Arbitrary Bodies", Progress in Aerospace Sciences, 1967, pp. 1-138.

Lewis, R. I., "Vortex Element Methods for Fluid Dynamic Analysis of Engineering Systems", Cambridge University Press, 2005, 12 pages.

Drela et al., "Viscous-Inviscid Analysis of Transonic and Low Reynolds Number Airfoils", AIAA Journal, vol. 25, No. 10, Oct. 1987, pp. 1347-1355.

Veldman, Arthur E. P., "New, Quasi-Simultaneous Method to Calculate Interacting Boundary Layers", AIAA Journal, vol. 19, No. 1, Jan. 1981, pp. 79-85.

Veldman et al., "The Inclusion of Streamline Curvature in a Quasi-Simultaneous Viscous-Inviscid Interaction Method for Transonic Airfoil Flow", Department of Mathematics, University of Groningen, Nov. 10, 1998, pp. 1-18.

Cebeci et al., "Viscid/Inviscid Separated Flows", AFWAL-TR-86-3048, Jul. 1986, 95 pages.

Carter, James E., "A New Boundary-Layer Inviscid Iteration Technique for Separated Flow", AIAA 79-1450, 1979, pp. 45-55.

Potsdam, Mark A., "An Unstructured Mesh Euler and Interactive Boundary Layer Method for Complex Configurations", AIAA-94-1844, Jun. 20-23, 1994, pp. 1-8.

Veldman, Arthur E. P., "Strong Viscous-Inviscid Interaction and the Effects of Streamline Curvature", CWI Quarterly, vol. 10 (3&4), 1997, pp. 353-359.

Veldman, Arthur E. P., "A Simple Interaction Law for Viscous-Inviscid Interaction", Journal of Engineering Mathematics, vol. 65, 2009, pp. 367-383.

Coenen et al., "Quasi-Simultaneous Viscous-Inviscid Interaction for Three-Dimensional Turbulent Wing Flow", ICAS 2000 Congress, 2000, pp. 731.1-731.10.

Veldman, Arthur E. P., "Quasi-Simultaneous Viscous-Inviscid Interaction for Transonic Airfoil Flow", American Institute of Aeronautics and Astronautics Paper 2005-4801, 2005, pp. 1-13.

\* cited by examiner

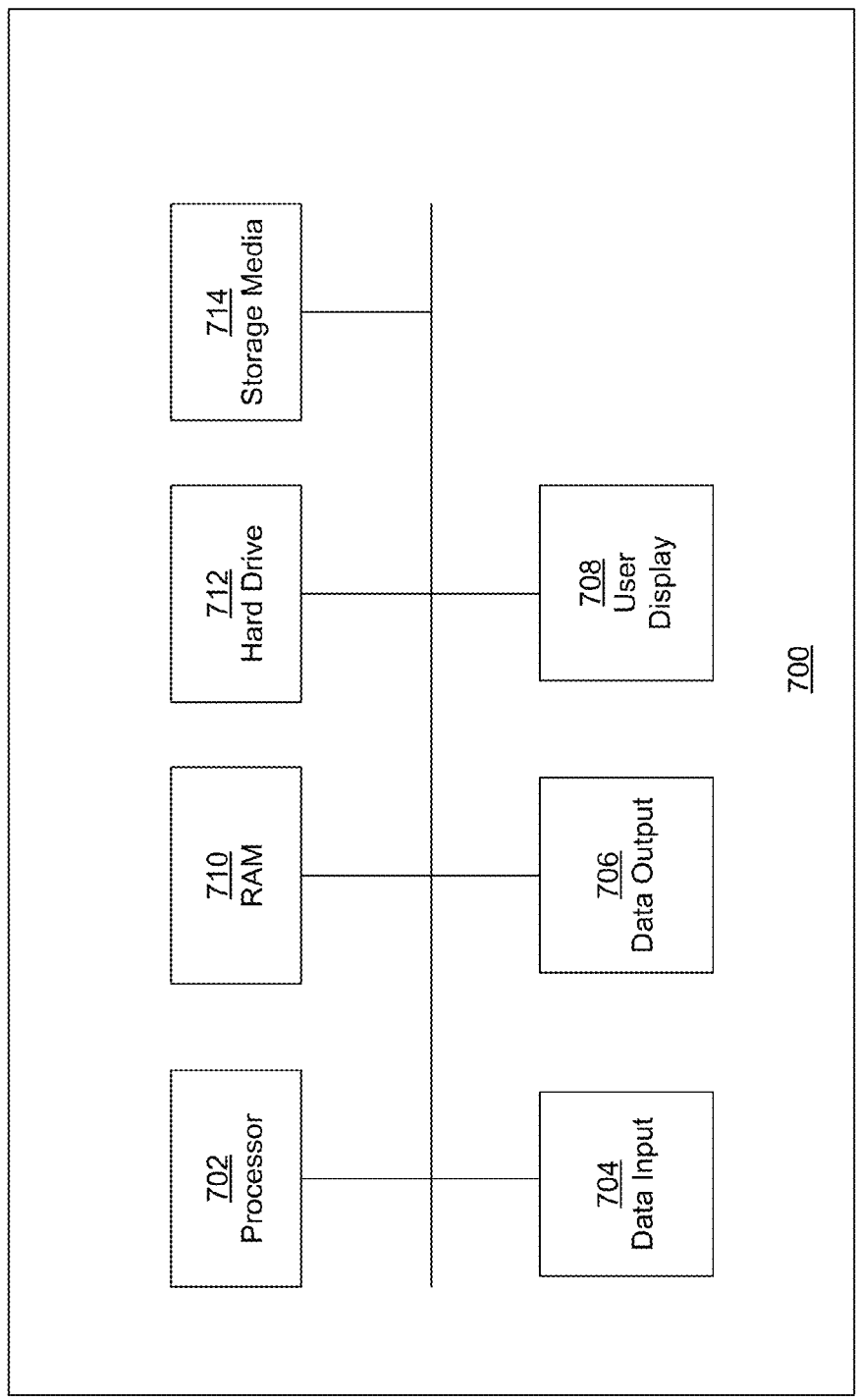

GENERATING INVISCID AND VISCOUS FLUID FLOW SIMULATIONS OVER A SURFACE USING A QUASI-SIMULTANEOUS TECHNIQUE

STATEMENT REGARDING FEDERALLY SPONSORED RESEARCH OR DEVELOPMENT

This invention was made with Government support under contract NNL08AA08C awarded by NASA. The Government has certain rights in the invention.

BACKGROUND

1. Field

This application relates generally to simulating a fluid flow over a surface and, more specifically, to generating both inviscid and viscous fluid-flow simulations using a quasi-simultaneous technique for a fluid flow over a computer-generated aircraft surface.

2. Description of the Related Art

Aerodynamic analysis of an aircraft moving through a fluid typically requires an accurate prediction of the properties of the fluid surrounding the aircraft. Accurate aerodynamic analysis is particularly important when designing aircraft surfaces, such as the surface of a wing or control surface. Typically, the outer surface of a portion of the aircraft, such as the surface of a wing, is modeled, either physically or by computer model, so that a simulation of the fluid flow can be performed and properties of the simulated fluid flow can be measured. Fluid-flow properties are used to predict the characteristics of the wing including lift, drag, boundary-layer velocity profiles, and pressure distribution. The flow properties may also be used to map laminar and turbulent flow regions near the surface of the wing and to predict the formation of shock waves in transonic and supersonic flow.

A computer-generated simulation can be performed on a computer-generated aircraft surface to simulate the fluid dynamics of a surrounding fluid flow. The geometry of the computer-generated aircraft surface is relatively easy to change and allows for optimization through design iteration or analysis of multiple design alternatives. A computer-generated simulation can also be used to study situations that may be difficult to reproduce using a physical model, such as supersonic flight conditions. A computer-generated simulation also allows a designer to measure or predict fluid-flow properties at virtually any point in the model by direct query, without the difficulties associated with physical instrumentation or data acquisition techniques.

In some cases, a computer-generated simulation includes a computational fluid dynamics (CFD) simulation module used to predict the properties of the fluid flow. A CFD simulation module estimates the properties of a simulated fluid flow by applying a field equation that estimates the interaction between small simulated fluid volumes, also referred to as fluid cells. Because a single CFD simulation module may include millions of individual fluid cells, the complexity of the relationship between fluid cells can have a large effect on the computational efficiency of the simulation. Complex CFD simulation modules can be computationally expensive and require hours or even days to execute using high-performance computer processing hardware.

To reduce the computational burden, in some instances it is desirable to use a CFD simulation module that simplifies the fluid dynamics and produces a fluid simulation that can be solved more rapidly. For example, for fluid flows that are relatively uniform or are located away from an aircraft surface, a simplified simulation that minimizes or ignores certain fluid dynamic phenomena can be used. In the examples discussed below, a simplified simulation may ignore fluid dynamic contributions due to fluid viscosity, which, in some cases, have little effect on the overall behavior of the fluid flow. A simplified simulation that ignores fluid viscosity may be called an inviscid simulation. By using an inviscid simulation to simulate at least part of the fluid flow, processing time may be improved.

In other situations, where the fluid flow is not as uniform, it may be necessary to use a CFD simulation module that is more sophisticated and capable of accurately predicting the fluid properties, using more complex fluid dynamics. In the examples discussed below, a more sophisticated simulation may account for dynamic contributions due to fluid viscosity. A simulation that accounts for fluid viscosity may be called a viscous simulation. Under certain conditions, a viscous simulation may be more accurate, particularly for portions of the fluid flow near the aircraft surface where fluid viscosity affects the results. However, viscous simulations are also likely to require more computing resources and therefore require more time to solve.

It may be advantageous to construct a hybrid computer-generated simulation that employs both an inviscid CFD simulation module in locations where the fluid flow is relatively uniform, and a viscous CFD simulation module in locations where the fluid dynamics are more complex. By combining different CFD simulation modules, a hybrid computer-generated simulation may increase processing speed while producing accurate results.

Using multiple CFD simulation modules may be difficult, particularly if the CFD simulation modules were not configured to work together. The interface between the simulation modules must be constructed so that the resulting computer-generated simulation is both computationally efficient and analytically robust. The techniques described herein solve some of the difficulties in implementing a computer-generated simulation using multiple simulation modules.

SUMMARY

One exemplary embodiment includes a computer-implemented method of generating a fluid-flow simulation over a computer-generated surface using a quasi-simultaneous technique. The simulation includes an inviscid fluid-flow mesh comprised of a plurality of inviscid fluid cells and a viscous fluid-flow mesh comprised of a plurality of boundary-layer fluid cells. At least some of the boundary-layer fluid cells are on or adjacent to the computer-generated surface.

An initial fluid property is determined for at least one inviscid fluid cell using an inviscid fluid simulation that does not simulate fluid viscous effects. An initial boundary-layer fluid property is determined for at least one of the boundary-layer fluid cells using the initial fluid property and a viscous fluid simulation that simulates fluid viscous effects. The at least one inviscid fluid cell is close in proximity to the at least one boundary-layer fluid cell.

An updated boundary-layer fluid property is determined for the at least one boundary-layer fluid cell using the initial fluid property, initial boundary-layer fluid property, and an interaction law. The interaction law approximates the inviscid fluid simulation using a matrix of aerodynamic influence coefficients computed using a two-dimensional surface panel technique and a fluid-property vector. In some embodiments, the interaction law approximates the inviscid fluid simulation using a matrix of aerodynamic influence coefficients computed using an axisymmetric surface panel technique instead of a two-dimensional surface panel technique. An updated fluid property for the at least one inviscid fluid cell is determined using the updated boundary-layer fluid property.

In some embodiments, the matrix of aerodynamic influence coefficients is adapted to account for compressibility by dividing each row by $(1-M_1^2)^{1/2}$, wherein $M_1$ is the local Mach number. In some embodiments, the matrix of aerodynamic influence coefficients is adapted row-by-row to implement either the subsonic or supersonic interaction law depending on the local Mach number. The matrix of aerodynamic influence coefficients may be further adapted to utilize a linear weighted average of the subsonic and supersonic interaction laws to approximate the changes to the inviscid fluid flow for local Mach numbers near Mach 1.

DESCRIPTION OF THE FIGURES

FIG. 7 depicts an exemplary computer system for simulating a fluid flow over an aircraft surface.

The figures depict one embodiment of the present invention for purposes of illustration only. One skilled in the art will readily recognize from the following discussion that alternative embodiments of the structures and methods illustrated herein can be employed without departing from the principles of the invention described herein.

DETAILED DESCRIPTION

Figure 1:
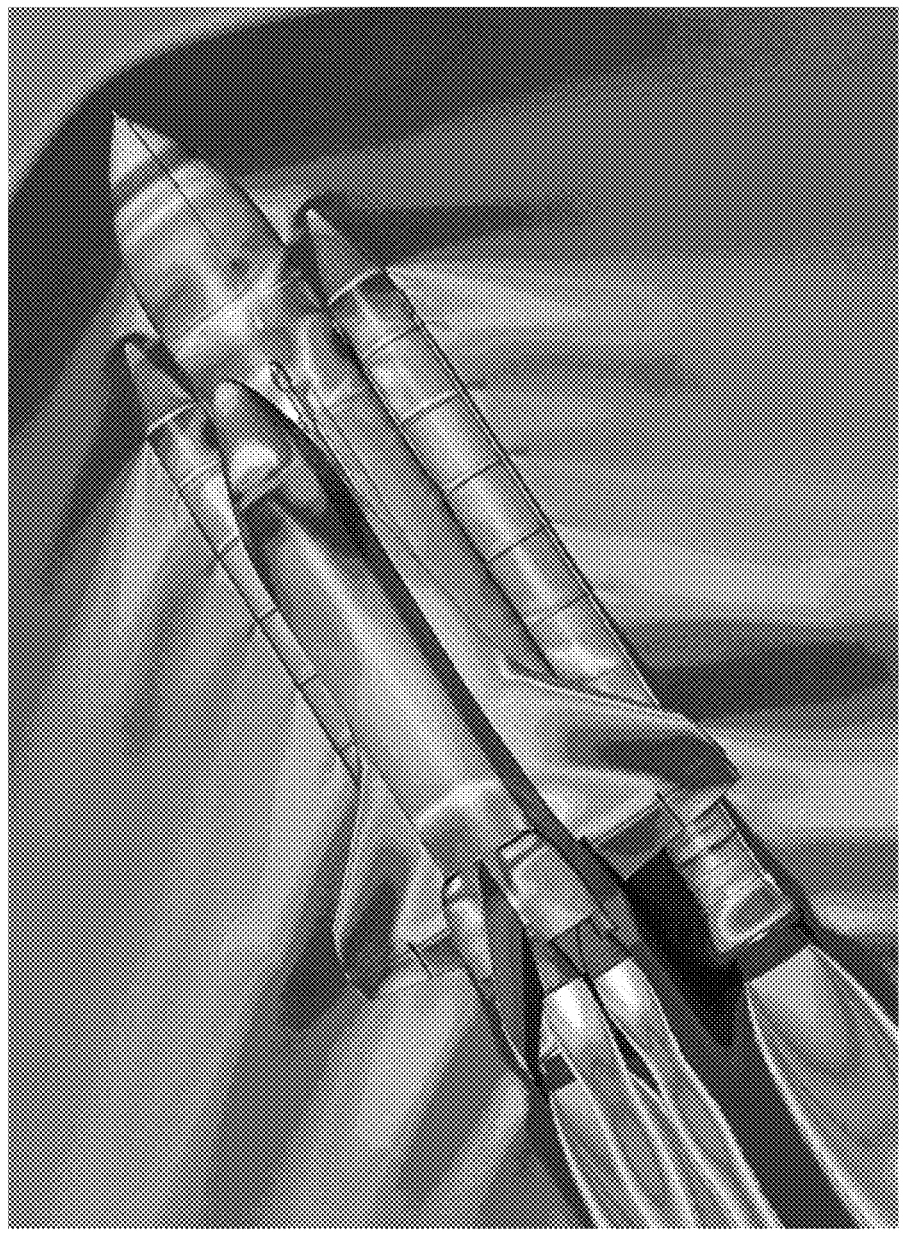
FIG. 1 depicts a computer-generated fluid flow applied to a computer-generated aircraft surface.

As discussed above, a computer-generated simulation can be used to analyze the aerodynamic performance of a proposed aircraft surface, such as a fuselage, wing, or control surface. Using known geometry modeling techniques, a computer-generated aircraft surface that represents the outside surface of the proposed aircraft can be constructed. FIG. 1 depicts an exemplary computer-generated aircraft surface of the Space Shuttle orbiter vehicle, external tank, and twin solid rocket boosters. A CFD fluid simulation module has been applied using the computer-generated aircraft surface of the Space Shuttle orbiter to predict the fluid properties of an exemplary fluid flow.

As shown in FIG. 1, the results of the simulation can be visually represented as shaded regions on the computer-generated aircraft surface of the Space Shuttle. Different shades represent the predicted pressure distribution resulting from the simulated fluid flow. In FIG. 1, transitions between the shaded regions represent locations of predicted pressure change across the surface of the Space Shuttle. Similarly, different pressures in the surrounding fluid flow are represented as differently shaded regions.

In FIG. 1, the simulation of the fluid flow is visualized by depicting the predicted surface-pressure distribution. However, the simulation may be visualized using other fluid properties, including velocity, air temperature, air density, and others. Additionally, the simulation may be used to visualize locations of developing shock waves or transitions between laminar and turbulent flow.

The simulation allows the designer or engineer to evaluate the performance of the aircraft geometry for various flow conditions. If necessary, changes can be made to the aircraft geometry to optimize performance or eliminate an unwanted aerodynamic characteristic. Another simulation can be performed using the modified geometry and the results can be compared. To allow for multiple design iterations, it is advantageous to perform multiple simulations in a short amount of time. However, as described above, there is a tradeoff between speed and accuracy of the simulation depending on the type of CFD simulation module used.

As described in more detail below, a computer-generated simulation can be constructed that uses multiple CFD simulation modules to simplify the calculations required to achieve a complete simulation of the fluid flow. The calculations can be further simplified by using an interaction law to approximate the results of one of the CFD simulation modules when performing the simulation. Specifically, an interaction law allows a first, viscous CFD simulation module to determine one or more predicted fluid properties by using the interaction law to estimate the predicted fluid properties of a second, inviscid CFD simulation module. For CFD simulation modules with results that are highly interdependent, an interaction law can be used to improve the speed and reliability of the simulation results.

As mentioned above, a computer-generated simulation may represent a fluid flow using a mesh of fluid cells. The size and shape of the fluid cells can vary depending on the type of fluid-flow mesh used. In some cases, the fluid cells are small, cuboid volumes of fluid. In other cases, the fluid cells are small, thin volumes of fluid, each thin volume having only a nominal thickness. In other cases, the fluid cells may be represented by a two-dimensional polygon or a single point.

In the examples provided below, inviscid regions of the fluid flow (typically away from the aircraft surface) are represented using a fluid-flow mesh of three-dimensional, cuboid fluid cells. Viscous regions of the fluid flow (typically near the surface of the aircraft) are represented using a fluid-flow mesh of either three-dimensional fluid cells, two-dimensional fluid cells, or a set of boundary-layer prediction points located along the computer-generated aircraft surface.

Both an inviscid and viscous CFD simulation modules predict the interactions between the fluid cells in the fluid-flow mesh, using a fundamental algorithm or field equation. The speed and accuracy of a CFD simulation module depends, in part, on the field equation used to predict the interaction between the flow cells. For an inviscid simulation, the field equation simplifies the relationship between flow cells by ignoring or minimizing viscous contributions. Viscous effects of a fluid can be minimized or ignored when, for example, there is not a significant velocity difference between adjacent fluid cells, and therefore shear forces due to internal friction or viscosity are minimal compared to inertial forces. Field equations for an inviscid simulation are typically less complex and require a less dense fluid-flow mesh, and therefore are more computationally efficient. For instance, an algorithm that solves the Euler equations may be used to simulate an inviscid fluid flow.

In other instances, a more complex field equation is used to more accurately predict the interaction between the fluid cells. For example, a method that solves the Navier-Stokes equations can be used to simulate the pressure and shear forces on the fluid cells. Unlike the Euler solver mentioned above, a Navier-Stokes solver accounts for the effects of viscosity and offers a more accurate simulation of a fluid flow.

However, the improved accuracy of a Navier-Stokes-based solution comes at the cost of increased computational load and increased operator preparation time, and therefore a Navier-Stokes solver is generally slower than an Euler-based algorithm. Thus, selecting the field equation for a CFD module often involves a tradeoff between speed and accuracy. In practice, designers may use faster Euler-based CFD models to evaluate multiple design iterations and then validate the final design iteration with a more accurate Navier-Stokes-based CFD model. However, if the Navier-Stokes CFD simulation reveals a design problem, the entire process must be repeated, wasting valuable time and computing resources.

The techniques described below are computer-generated simulations that use both inviscid and viscous field equations to achieve acceptable accuracy without requiring the computational burden of a full viscous CFD simulation (e.g., a Navier-Stokes-based CFD simulation). In many simulations, there is a region of the fluid flow that can be accurately predicted without taking viscous contributions into account. For example, regions of the fluid flow that are located away from an aircraft surface or wing surface, have a relatively uniform velocity profile. Therefore, an inviscid simulation using, for example, an Euler-based analysis, can be used to accurately predict the behavior of the fluid-flow region. In other fluid-flow regions, where there is a less uniform velocity profile, a more complex, viscous simulation can be used.

It may be advantageous to generate a simulation using more than one field equation to simulate the fluid flow over a computer-generated aircraft surface. In particular, it may be advantageous to generate a simulation using an inviscid CFD simulation module (using an inviscid field equation) to simulate regions of the flow away from the aircraft surface and a viscous CFD simulation module (using a viscous field equation) to simulate regions of the flow near the aircraft surface. This technique reduces the computational load by simplifying the simulation for regions of the flow that do not need the more complex, viscous CFD simulation.

Typically, the inviscid (intertia-dominated) and viscous (viscosity-dominated) regions of the fluid flow are in physical contact with each other, and therefore the predicted fluid-flow properties of, for example, the inviscid region may influence the fluid properties of the viscous region. In some cases, there is a strong interaction between the inviscid and viscous regions of the fluid flow, and small changes in the inviscid fluid properties may result in a large change in the viscous fluid properties, and vice versa. This is particularly true near trailing edges of wings and where the fluid-flow is transitioning from supersonic to subsonic flow.

A simulation that uses multiple CFD simulation modules to simulate the different regions of the fluid flow must manage the interface between the CFD simulation modules to accurately simulate the interdependencies between the respective simulated regions of the fluid flow. Typically, this requires that the multiple CFD modules converge to the same result even though the CFD modules use different field equations to predict the fluid properties.

In one example, fluid properties predicted for each region of the fluid flow are passed between the respective CFD simulation modules. Sometimes referred to as the direct method, the fluid properties of, for example, an inviscid CFD simulation module are passed to viscous CFD simulation module. In turn, the results of the viscous CFD simulation module are passed back to the inviscid CFD simulation module. This is easily accomplished because the natural output of the inviscid CFD simulation module is the natural input of the viscous CFD simulation module, and, in turn, the natural output of the viscous CFD simulation module is the natural input of the inviscid CFD simulation module. Examples of natural inputs and outputs of inviscid and viscous CFD simulation modules are discussed in more detail below with respect to equations 13, 18, 19, and 20. These natural forms of the CFD simulation modules are called direct solvers, leading to them being designated as a "direct method." This exchange is conducted for multiple iteration steps until a convergent solution is determined. It is also possible to create inverse-mode versions of the inviscid and viscous CFD solvers where the inputs and outputs are swapped. The inverse solvers can be used to formulate the direct-inverse (a.k.a. semi-inverse) method and the inverse-inverse (a.k.a. full-inverse) method for solving the coupled viscous-inviscid problem.

During each iteration step, the CFD simulation modules determine the fluid properties for a respective region of the fluid flow without accounting for dynamic contributions from other regions of the fluid flow. As a result, there may be drawbacks to performing a direct method simulation. In some cases, the two CFD simulation modules may not converge to a single solution. In other cases, the CFD simulation modules may converge but so slowly as to not be of practical utility.

As an alternative, the field equations from the CFD simulation modules may be combined to determine a single set of fluid-properties for a combined fluid-flow region. That is, both the inviscid and viscous field equations are solved simultaneously so that the dynamic contributions from the two simulated regions of the fluid flow are accounted for. This technique may also be called a simultaneous simulation. There are, however, drawbacks to performing a simultaneous simulation. First, constructing a simultaneous viscous-inviscid simulation is a very complex task and has rarely been accomplished for three-dimensional flow simulations. Second, the simultaneous simulation technique cannot be applied using existing inviscid CFD simulation modules. Instead, a simultaneous simulation requires specially-crafted inviscid and viscous simulation modules that can work with a single equation solver capable of simultaneously solving many non-linear equations. This impairs the compatibility with existing simulation tools, and therefore may dramatically increase development and implementation costs.

As discussed in more detail below, inviscid and viscous CFD simulation modules can be coupled using a quasi-simultaneous technique. Using a quasi-simultaneous technique, the viscous CFD simulation module uses an interaction law to account for dynamic changes to the inviscid fluid properties due to changes in the viscous region of the fluid flow.

Using a quasi-simultaneous technique, an existing inviscid CFD simulation module can be used to predict a set of initial inviscid fluid property values (for an inviscid region of fluid flow). A set of viscous fluid properties (for a viscous region of the fluid flow) are determined using the initial inviscid fluid properties, a viscous CFD simulation module, and an interaction law that approximates changes to the inviscid fluid properties due to presence of the viscous region of the fluid flow.

A quasi-simultaneous simulation may provide several advantages. First, because the viscous CFD simulation module includes a prediction of the changing inviscid fluid properties, iterated results between the two CFD simulation modules may converge more rapidly. Additionally, by selecting an interaction law that enforces key boundary conditions, the converged results are more likely to result in a robust and accurate prediction of the fluid flow. Specifically, an interaction law based on linearized potential flow equations can be used to enforce the Kutta condition at the trailing edge of the wing surface, and therefore ensures that fluid-flow information is propagated between the top and bottom viscous flow layers near the computer-generated aircraft surface (particularly near a computer-generated wing surface).

The techniques described herein provide a quasi-simultaneous simulation that combines an inviscid and a viscous CFD simulation module using an interaction law based on linearized potential flow. The following discussion provides an example of a simulated fluid flow over a wing surface. However, the technique may also be applied to a simulated fluid flow over any type of surface subjected to a fluid flow. For example, the following techniques could be applied to the surface of a space vehicle, land vehicle, watercraft, or other object having a surface exposed to a fluid flow. In addition, the following techniques can be applied to simulations of various types of fluid flow, including, for example, a gas fluid flow or liquid fluid flow.

1. Quasi-Simultaneous Technique for Combining CFD Simulation Modules

As discussed above, a computer-generated simulation can use both inviscid and viscous CFD simulation modules to represent different regions of the fluid flow. The two CFD simulation modules must be linked so that the results from each module provide an accurate and realistic prediction of the combined fluid-flow regions.

In general, and as explained in more detail below in Section 4, an inviscid CFD simulation module can be used to simulate outer fluid-flow regions that are at least some distance away from an aircraft surface. Also explained in Section 4, a viscous CFD simulation module can be used to simulate fluid-flow regions that are adjacent to an aircraft surface, such as a boundary-layer fluid-flow region close to a wing surface.

Figure 2:
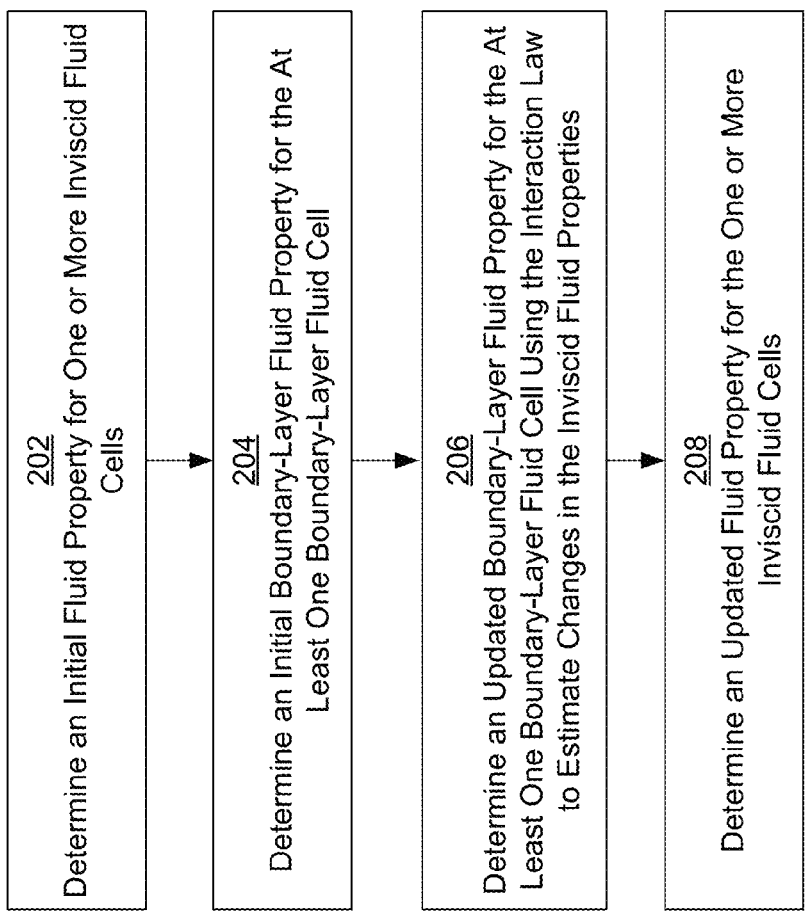
FIG. 2 depicts an exemplary process for coupling an inviscid and boundary-layer CFD simulation module using a quasi-simultaneous technique.

FIG. 2 depicts an exemplary process 200 for using a quasi-simultaneous technique to couple inviscid and viscous CFD simulation modules. More specifically, the exemplary process 200 uses quasi-simultaneous technique with an interaction law to approximate outer (inviscid) fluid-flow effects on the simulated boundary-layer (viscous) fluid-flow region and vice versa. As explained in more detail below, an interaction law that uses linearized potential flow can be used to enforce key boundary conditions on the simulation so that the predicted result is both an accurate and realistic prediction of the combined fluid flow.

In the following discussion, for simplicity, the result of the inviscid simulation is assumed to depend only on the two-dimensional displacement thickness, $\delta^*$, and return the boundary-layer edge velocity, $u(u_n = E(\delta^*_n))$. In general, however, the result of an inviscid simulation may depend on the geometry of the entire aircraft including the surface slope of both the chordwise and spanwise displacement thicknesses in three dimensions (or instead on the transpiration flux which itself depends on the two displacement thickness slopes). Similarly, the boundary-layer simulation is simplified to depend only on the boundary-layer edge velocity u and to return the displacement thickness ($\delta^*_n = B(u_n)$). However, in general, the boundary-layer simulation may depend on the many fluid properties at the boundary-layer edge (velocity vector, pressure, density, etc.) and can return any number of boundary-layer parameters including the chordwise and spanwise displacement thicknesses, transpiration flux, and transpiration velocity.

In operation 202, an initial fluid property, for example velocity $u_n$, is determined for one or more inviscid fluid cells 420 of a fluid-flow mesh. As explained in more detail below with respect to FIGS. 4 and 5, an inviscid fluid flow can be simulated using a fluid-flow mesh 402 of inviscid fluid cells. The fluid properties of each inviscid fluid cell (including the initial fluid velocity $u_n$) are predicted using an inviscid CFD simulation module.

The initial fluid velocity $u_n$, also called the edge fluid velocity, may be also expressed as a solution of the Euler equations $E(\delta^*_n)$, which may be dependent on the initial boundary-layer thickness $\delta^*_n$. In some cases, the initial fluid velocity $u_n$ is a vector quantity represented using three-dimensional velocity components.

An exemplary inviscid CFD simulation module is discussed below with respect to inviscid field equation 13. The initial fluid velocity $u_n$ may be determined using equation 13 and a set of initial conditions used to seed the simulation. The inviscid CFD simulation module may iterate multiple times before determining the initial fluid velocity value $u_n$. In some cases, the initial fluid velocity $u_n$ represents the outer (inviscid) fluid-flow conditions ignoring effects due to a boundary-layer fluid-flow region.

In operation 204, initial boundary-layer fluid properties, for example, boundary-layer thickness $\delta^*_n$ is determined for at least one boundary-layer fluid cell 430. The initial boundary-layer thickness $\delta^*_n$ is determined using equations 18, 19, and 20 and the inviscid fluid properties, including the initial fluid velocity $u_n$. The initial boundary-layer thickness $\delta^*_n$ may be a predicted thickness or transpiration flux, as discussed in more detail below with respect to equations 18, 19, and 20. The initial boundary-layer fluid velocity $u_{bl\,n}$ can also be determined using boundary-layer field equations 18 and 19, if solved in inverse mode. The initial boundary-layer fluid velocity $u_{bl\,n}$ can also be expressed as $B(\delta^*_n)$, which is dependent on initial boundary-layer thickness $\delta^*_n$.

Figure 4:
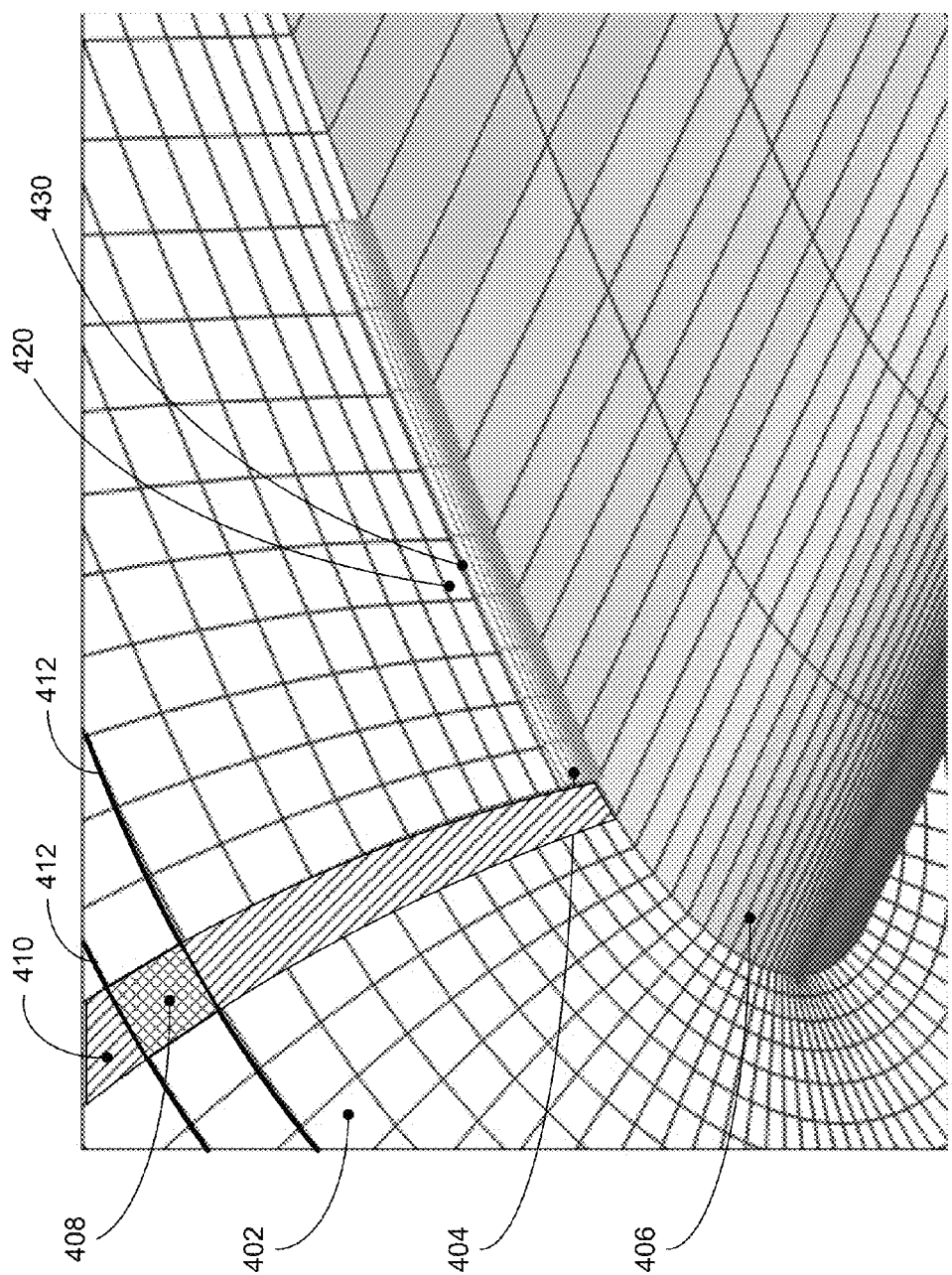
FIG. 4 depicts an exemplary surface mesh and a fluid-flow mesh.
Figure 5:
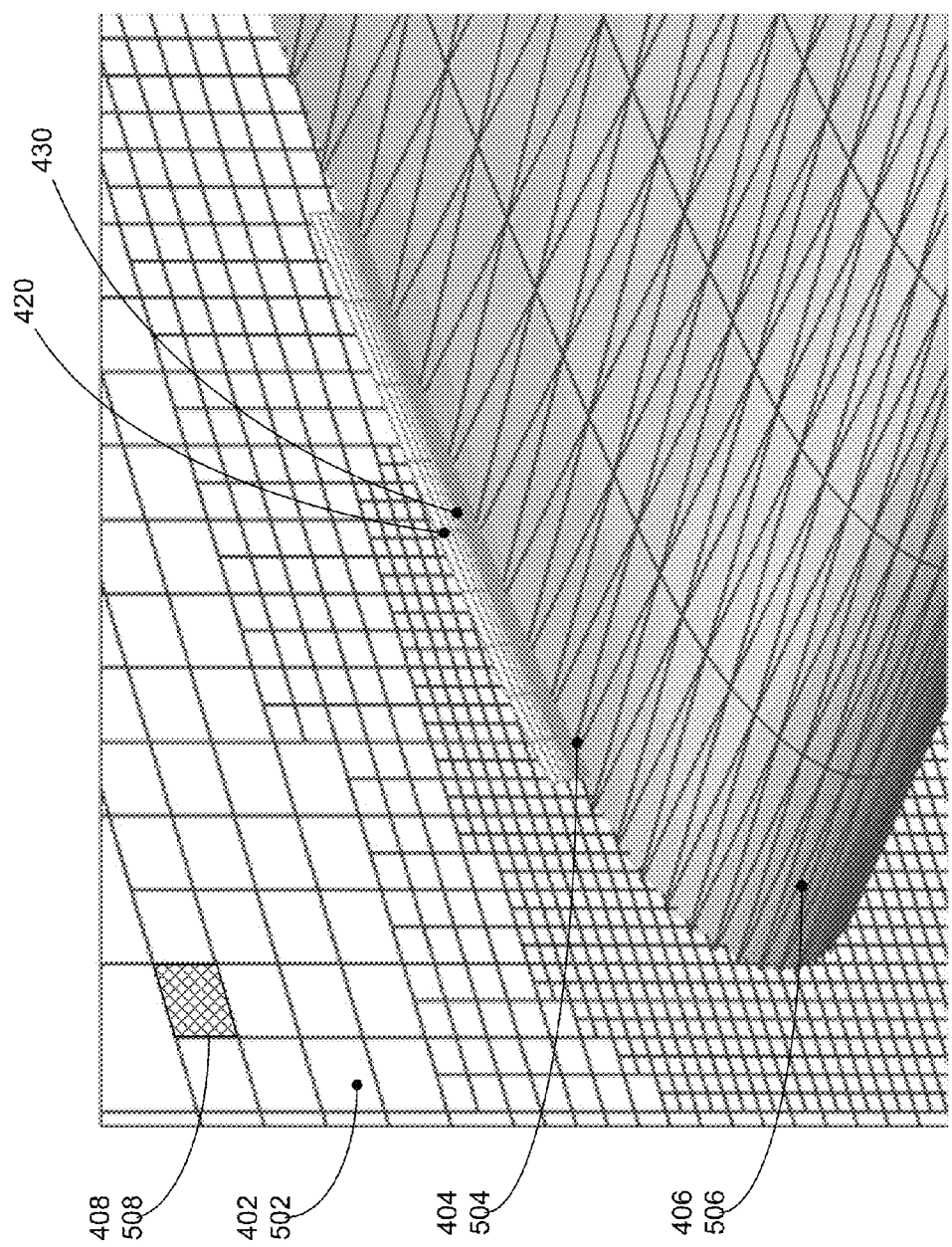
FIG. 5 depicts an exemplary surface mesh and a fluid-flow mesh.

As shown in FIGS. 4 and 5, the at least one boundary-layer fluid cell 430 should be close in proximity to one or more inviscid fluid cells 420. The fluid cells 430 and 420 should be proximate so that the updated boundary-layer thickness $\delta^*_{n+1}$ can be influenced by of the nearby regions of the inviscid fluid flow.

In operation 206, an updated boundary-layer fluid property $\delta^*_{n+1}$ is determined for the at least one boundary-layer fluid cell using the boundary-layer equations and an interaction law $I(\delta^*)$ to approximate the inviscid fluid simulation. The updated boundary-layer fluid property $\delta^*_{n+1}$ may be sensitive to changes in the inviscid fluid-flow region, particularly if there is a strong interaction between the inviscid and boundary-layer fluid-flow regions. An interaction law $I(\delta^*)$ approximates changes in the inviscid fluid flow due to changes in the boundary-layer fluid flow. A more detailed discussion of an exemplary interaction law is included in Section 2, below.

Using a quasi-simultaneous technique, an updated boundary-layer fluid property value $\delta^*_{n+1}$ can be determined by simultaneously solving for the boundary-layer fluid properties at the time n+1 (using, for example, equations 18, 19, and 20, below) and a prediction of the inviscid fluid-flow properties at time n+1 (using, for example, $I(\delta^*)$ in equation 1, below).

In general, the prediction of an inviscid fluid velocity at time n+1 ($u'_{n+1}$), can be expressed in terms of an initial inviscid fluid velocity at time n($u_n$ or $E(\delta^*_n)$) and an interaction law $I(\delta^*)$:

$$u'_{n+1} = E(\delta^*_n) + I(\delta^*_{n+1}) - I(\delta^*_n) \qquad \text{Equation 1}$$

As discussed in more detail below with respect to equations 5 and 7 below, using an interaction law $I(\delta^*)$ that is based on the principles of linear potential flow, the results may more accurately reflect real fluid dynamics by enforcing boundary conditions, including the Kutta condition. Additionally, because the interaction law $I(\delta^*)$ is only used to update the inviscid fluid velocity due to an incremental change in the displacement thickness since the previous iteration, it does not affect the converged solution, and therefore, the absolute accuracy of interaction law $I(\delta^*)$ prediction is not critical.

Using a quasi-simultaneous coupling technique, the interaction law $I(\delta^*)$ can be used as a proxy for updated fluid properties that would otherwise be determined using the inviscid CFD simulation module. As shown in equation 1, the interaction law $I(\delta^*)$ can be used to predict the inviscid fluid velocity at time n+1 ($u'_{n+1}$) to estimate changes to the inviscid fluid-flow region without having to perform another complete simulation using the inviscid CFD simulation module. The relative simplicity of the interaction law $I(\delta^*)$, allows the interaction law to be combined with boundary-layer field equations 18 and 19 to obtain an improved prediction of the boundary-layer fluid properties.

As discussed above, a boundary-layer CFD simulation module (using boundary-layer field equations 18 and 19, below) can be used to determine an initial boundary-layer fluid velocity $u_{n\ bl}$ given an initial boundary-layer displacement thickness $\delta^*_n$ (thus, $u_{n\ bl}=B(\delta^*_n)$). Similarly, an inviscid CFD simulation module can compute a fluid velocity $u_n$ given an initial boundary-layer displacement thickness $\delta^*_n$ (thus, $u_n=E(\delta^*_n)$). Specifying that $u=u_{bl}$ and using Newton's method to solve the simultaneous equations for an updated boundary-layer thickness $\delta^*_{n+1}$, a Newton iteration can be expressed as:

$$\delta^*_{n+1} = \delta^*_n + \frac{1}{\frac{dE}{d\delta^*} - \frac{dB}{d\delta^*}}(B(\delta^*_n) - E(\delta^*_n)) \qquad \text{Equation 2}$$

Similarly if equation 1 is used to solve for $u'_{n+1}$ simultaneously with $u'_{n+1}=u_{n+1}=B(\delta^*_{n+1})$ using Newton's method the updated boundary-layer thickness $\delta^*_{n+1}$ can be expressed as:

$$\delta^*_{n+1} = \delta^*_n + \frac{1}{\frac{dI}{d\delta^*} - \frac{dB}{d\delta^*}}(B(\delta^*_n) - E(\delta^*_n)). \qquad \text{Equation 3}$$

Expressed in terms of fluid velocities $u_{bl\ n}$ and $u_n$, the updated boundary-layer thickness $\delta^*_{n+1}$ can be written as:

$$\delta^*_{n+1} = \delta^*_n + \frac{1}{\frac{dI}{d\delta^*} - \frac{du_{bl\ n}}{d\delta^*}}(u_{bl\ n} - u_n). \qquad \text{Equation 4}$$

In this way, an updated boundary-layer thickness $\delta^*_{n+1}$ can be determined using initial boundary-layer thickness $\delta^*_n$, the initial inviscid fluid velocity $u_n$, initial boundary-layer fluid velocity $u_{n\ bl}$, and gradient of the interaction law $$\frac{dI}{d\delta^*}.$$

The advantage is that the gradient of the full inviscid equations ($dE/d\delta^*$) is generally too complicated to be calculated in a practical manner (as would be needed in order to apply the simultaneous method mentioned above). Equations 2 through 4 illustrate that the quasi-simultaneous method has some qualities in common with the simultaneous method solved using an approximate Newton method. Thus the designation as a "quasi-simultaneous" method.

In operation 208, an updated fluid velocity $u_{n+1}$ or $E(\delta^*_{n+1})$ is determined for the one or more inviscid fluid cells using the updated boundary-layer thickness $\delta^*_{n+1}$. The updated boundary-layer thickness $\delta^*_{n+1}$ may affect the inviscid or outer fluid flow by increasing or decreasing the size of the boundary-layer region effectively changing the shape of the inviscid fluid-flow region around the aircraft surface. An updated fluid velocity $u_{n+1}$ can be calculated using an inviscid CFD simulation module (using, for example, equation 13, below). The updated fluid velocity $u_{n+1}$ or $E(\delta^*_{n+1})$ for the one or more inviscid fluid cells can be used to update the other inviscid fluid cells in the fluid-flow mesh.

The operations of process 200 can be repeated using the updated inviscid fluid $u_{n+1}$ as a new initial inviscid fluid velocity $u_n$ (above). In this way, process 200 can be iterated multiple times until convergent results are achieved.

Figure 3A:
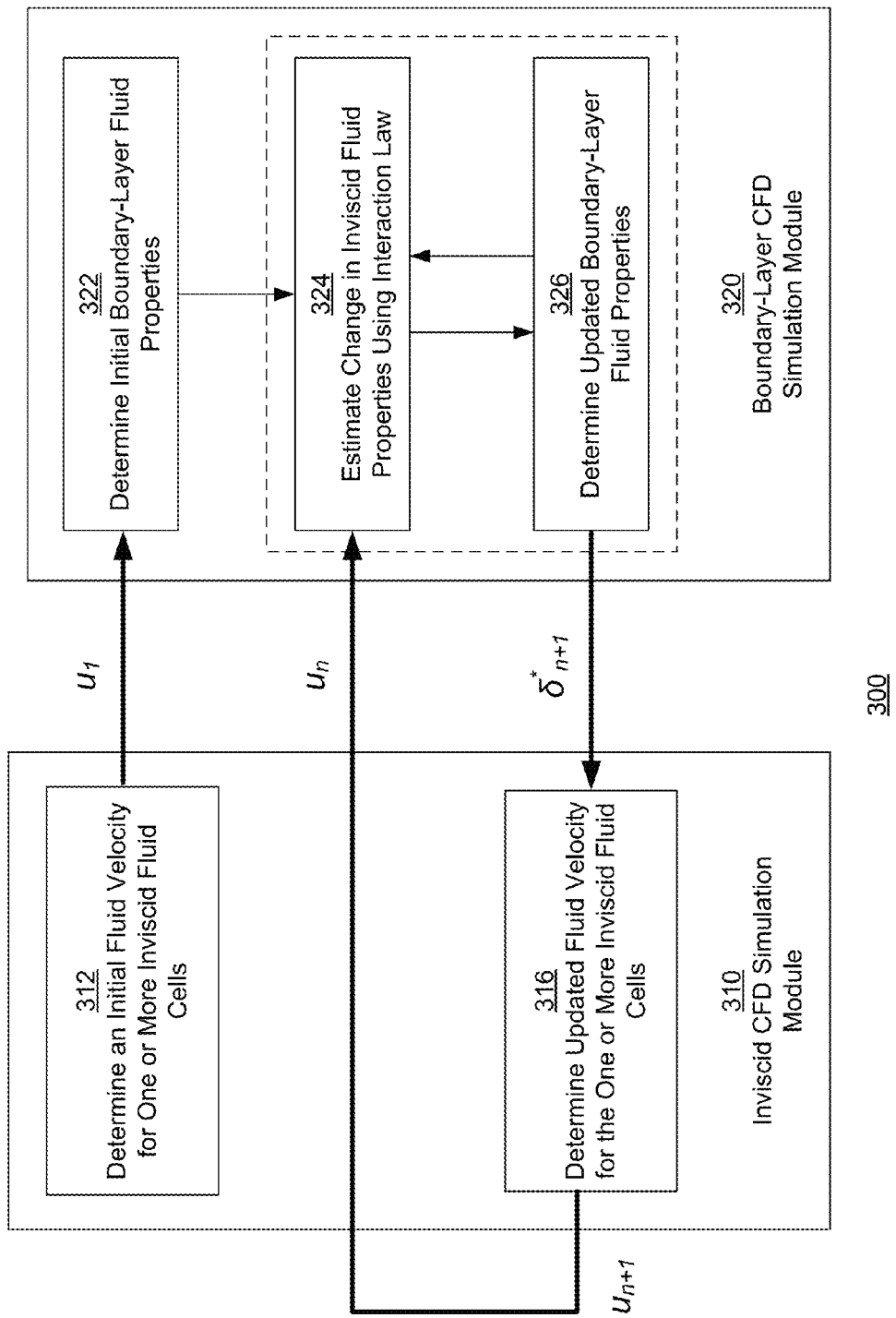
FIGS. 3a and 3b depict exemplary data flows between an inviscid and boundary-layer CFD simulation module.
Figure 3B:
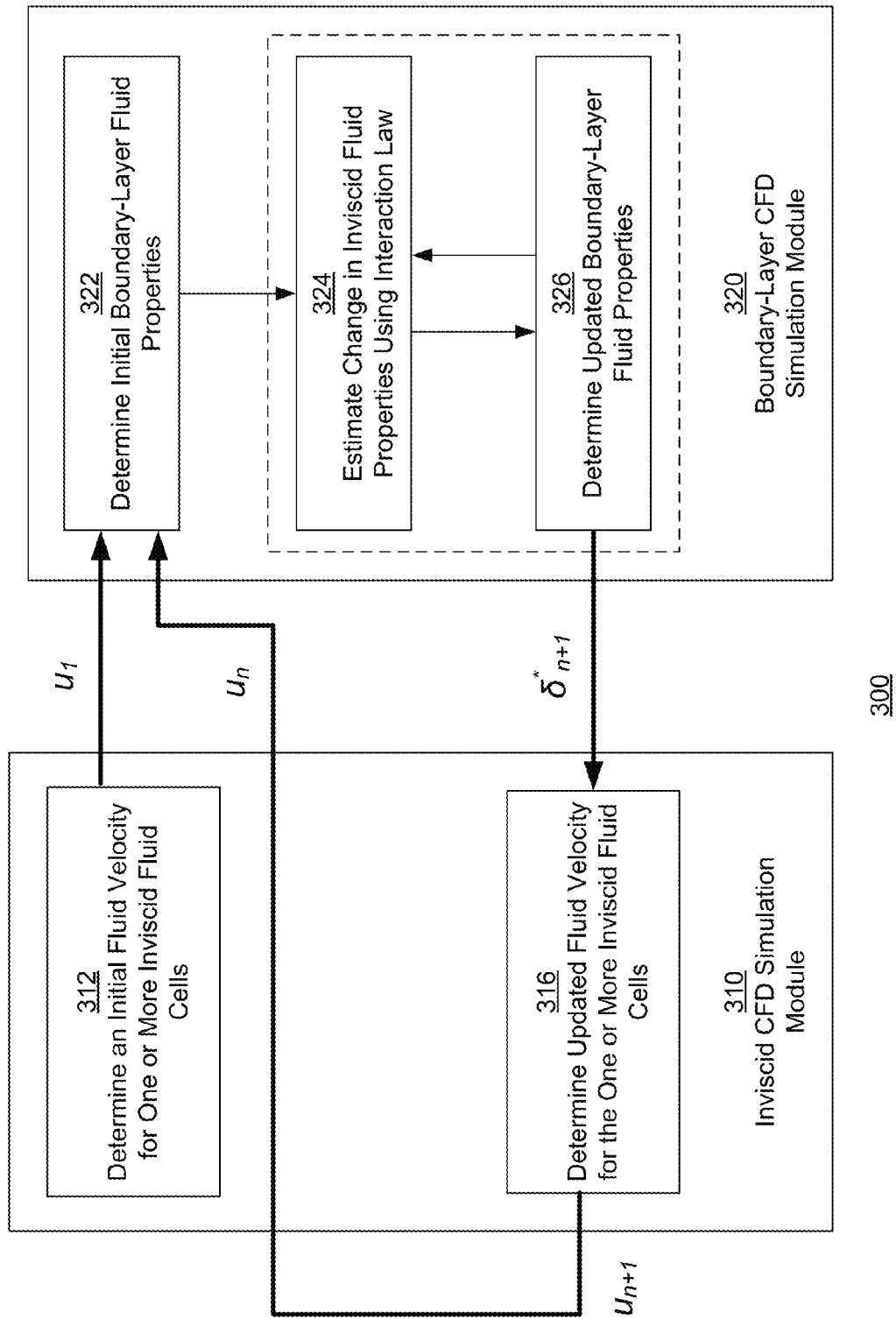

FIGS. 3a and 3b depict an exemplary data flow 300 for iterating results between an inviscid CFD simulation module 310 and a viscous or boundary-layer CFD simulation module 320. The data flow 300 can be used to link an existing inviscid CFD simulation module 320 with a viscous CFD simulation module 310 that has been adapted to use a quasi-simultaneous technique.

In operation 312, an initial fluid velocity $u_1$ ($u_n$ where n=1) is determined for one or more inviscid fluid cells 420 of a fluid-flow mesh. As explained above with respect to operation 202, the fluid properties of each inviscid fluid cell (including the initial fluid velocity $u_1$) can be predicted using the inviscid CFD simulation module 310. Specifically, the initial fluid velocity $u_1$ may be determined using equation 13 and a set of initial conditions used to seed the simulation. The initial fluid velocity $u_1$ is passed to a boundary-layer CFD simulation module 320.

In operation 322, initial boundary-layer fluid properties, boundary-layer thickness $\delta^*_1$ or velocity $u_{bl\ 1}$ ($\delta^*_n$ and $u_{bl\ n}$ where n=1) are determined for at least one boundary-layer fluid cell 430. As explained above with respect to operation 204, the initial boundary-layer thickness $\delta^*_1$ or initial boundary-layer fluid velocity $u_{bl\ 1}$ can be determined using boundary-layer field equations 18, 19, and 20 of the boundary-layer CFD simulation module 320.

In operation 324, a change to the inviscid fluid properties is estimated by applying equation 1. Discussed in more detail in Section 2 below, an interaction law that uses linearized potential flow can be used to enforce key boundary conditions on the simulation.

In operation 326, an updated boundary-layer fluid property $\delta^*_{n+1}$ is determined for the at least one boundary-layer fluid cell using the result of operation 324, which uses an interaction law $I(\delta^*)$ to approximate the inviscid fluid simulation, as explained above with respect to operation 206. The updated boundary-layer fluid property $\delta^*_{n+1}$ is passed to the inviscid CFD simulation module 310.

As shown in FIGS. 3a and 3b, the operations 324 and 326 may be repeated until the iteration converges to a compatible solution, or, preferably, operations 324 and 326 are solved simultaneously using standard iterative techniques for solving multiple nonlinear equations such as Newton's method or Gauss-Seidel relaxation.

In operation 316 an updated fluid velocity $u_{n+1}$ or $E(\delta^*_{n+1})$ is determined for the one or more inviscid fluid cells. As explained above with respect to operation 208, the updated fluid velocity $u_{n+1}$ can calculated using an inviscid CFD simulation module 310 (using, for example, equation 13, below). The updated fluid velocity $u_{n+1}$ or $E(\delta^*_{n+1})$ for the one or more inviscid fluid cells can be used to update the other inviscid fluid cells in the fluid-flow mesh.

As shown in FIG. 3a, the updated fluid velocity $u_{n+1}$ can also be used to seed another iteration of data flow 300 with the updated fluid velocity $u_{n+1}$ serving as the fluid velocity $u_n$ in operation 326. Alternatively, as shown in FIG. 3b, the updated fluid velocity $u_{n+1}$ can be used to seed another iteration of data flow 300 with the updated fluid velocity $u_{n+1}$ serving as the fluid velocity $u_n$ in operation 322. In this way, data flow 300 can be iterated multiple times until convergent results are achieved.

2. Exemplary Interaction Law

As discussed above, an interaction law can be used to estimate updated inviscid fluid properties due to changes in a nearby viscous fluid flow. A viscous CFD simulation module incorporating an interaction law can anticipate changes to the inviscid fluid flow without having to perform a complete inviscid simulation using, for example, an inviscid CFD simulation module. For neighboring fluid flows that are highly interdependent, an interaction law can be used to improve the speed and reliability of the simulation results.

As mentioned above, an interaction law can also be used to enforce boundary conditions so that the physical constraints of an actual fluid flow over and around a wing surface are maintained. For example, the Kutta condition at the trailing edge of an aircraft surface is enforced ensuring that the fluid-flow information is propagated between, for example, the top and bottom surfaces of a computer-generated wing surface.

Figure 6A:
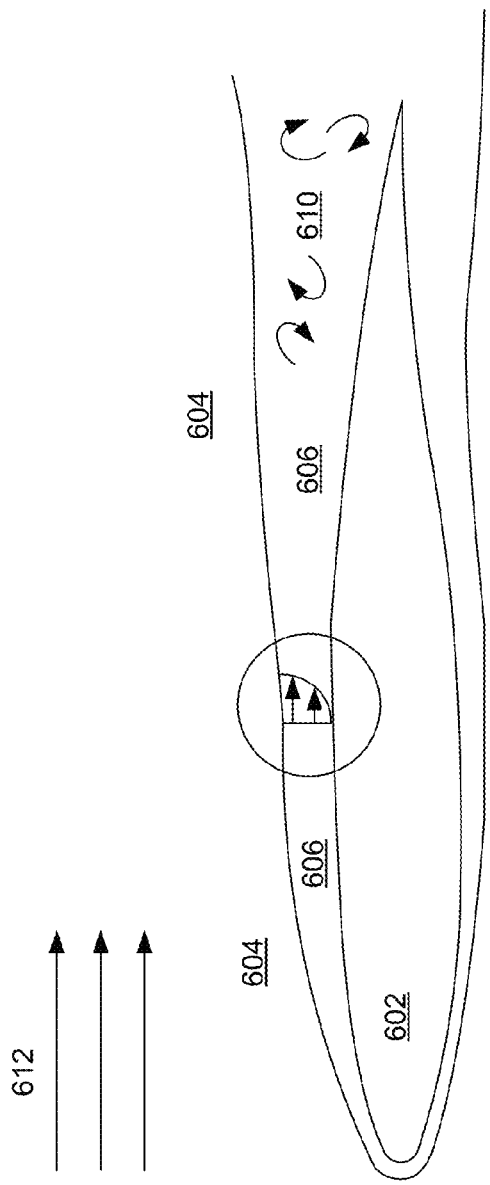
FIGS. 6a and 6b depict an exemplary fluid flow around a wing surface.
Figure 6B:
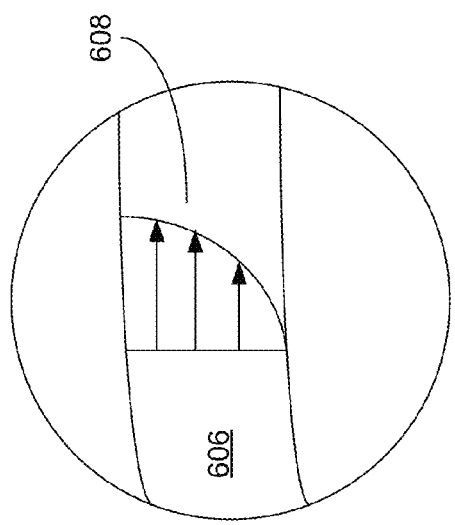

In the example below, a two-dimensional surface panel technique using linearized potential flow theory is used as the basis for the interaction law. This approach simplifies the calculation by representing the inviscid fluid flow as a two-dimensional strip along a cross section of a computer-generated aircraft surface. The following example is performed for a computer-generated wing surface (as shown in FIGS. 6a and 6b).

For a computer-generated wing surface the interaction law can be expressed as:

$$I(\delta^*) = \Sigma d_{i,j} m_j, \qquad \text{Equation 5}$$

where the variable $m_j$ represents the product of boundary-layer fluid properties: edge density $\rho_e$, edge velocity $u_e$, and boundary-layer thickness $\delta^*$:

$$m = \rho_e u_e \delta^*. \qquad \text{Equation 6}$$

Similarly an interaction law for a swept/tapered wing surface can be expressed as:

$$I(\delta^*) = \Sigma b_{i,j} v_{wj}, \qquad \text{Equation 7}$$

where $v_w$ is the transpiration velocity at the surface. Matrices $d_{i,j}$ and $b_{i,j}$ are functions of the computer-generated aircraft surface geometry and are also referred to as aerodynamic influence coefficient matrices.

The interaction influence coefficients in equations 5 and 7 can be computed using a two-dimensional surface panel technique. For example, matrices $d_{i,j}$ and $b_{i,j}$ can be derived using a set of flat panels containing sources of constant strength and vortices of linearly varying strength that shape the approximated inviscid fluid flow. The sources induce a transpiration flow perpendicular to the computer-generated aircraft surface, thus modeling the effect of a boundary-layer fluid-flow region having a thickness $\delta^*$. Collectively, the sources and vortices modify the path of an approximated inviscid fluid-flow region to flow around the computer-generated aircraft surface and boundary-layer fluid-flow region (having a thickness $\delta^*$). An inviscid fluid velocity u can be estimated using this approximated inviscid fluid flow. As suggested above, this approach can also be used to enforce the Kutta condition at the trailing edge of a computer-generated wing surface, and therefore ensures that flow information is propagated from the region of the flow near the trailing edge of the wing surface to the flow around other portions of the wing surface encompassing both the top and the bottom surface of the computer-generated wing geometry. Moreover, specific coefficient schemes can be implemented in matrices $d_{i,j}$ and $b_{i,j}$ to account for either blunt or sharp trailing edges.

Equations 5 and 7 apply only for subsonic incompressible flow around a wing surface when the influence coefficients are generated using a linear surface panel technique, as described above. To increase applicability to higher-speed flows up to transonic flows, a compressibility correction can be added to the interaction law following the transonic small disturbance corrections described by Spreiter and Alksne. See, e.g., Spreiter, J. R. and Alksne, A. Y., "Thin Airfoil Theory Based on Approximate Solution of the Transonic Flow Equation," NASA TR-1359, 1958. Using this technique, the magnitude of each row of the $b_{i,j}$ or $d_{i,j}$ matrix can be increased according to the local sweep-perpendicular Mach number by dividing by the term $(1-M_1^2)^{1/2}$. The value of the Mach number is derived from the solution of the Euler equations (for example, equation 13). Here, sweep-perpendicular Mach number is the component of local velocity in a particular direction divided by the local speed of sound. That particular direction may be taken to be: perpendicular to the local geometric wing sweep; along a set of points, volumes, or fluid cells on which the boundary-layer equations are solved; or perpendicular to the local sweep of the lines of constant pressure (isobars) on the computer-generated surface.

Other compressibility corrections may be used. In two-dimensional flows, the so-called Karman-Tsien correction may be applied. In three-dimensional flows, the Prandtl-Glauert correction may be applied, although the Prandtl-Glauert correction may be less accurate. The improved accuracy of the Karman-Tsien over Prandtl-Glauert may be due, in part, to a better approximation of the local Mach number. For fluid simulations where the local Mach number cannot be calculated directly, an approximation may be made. However, when the outer (inviscid) fluid flow is computed using the Euler equations (e.g., equation 13) the local Mach number is available directly.

For supersonic flow condition, equations 8 and 9, below, can be used to compute edge velocity $u_e$ in the interaction law. Equation 8 can be used for a two-dimensional strip boundary-layer estimate:

$$u_{e(n+1)} = u_{e(n)} - \frac{1}{\sqrt{M_{ei}^2 - 1}} \left( \frac{dm_{(n)}}{ds} - \frac{dm_{(n+1)}}{ds} \right), \qquad \text{Equation 8}$$

and equation 9 can be used for three-dimensional and for sweep/taper-based boundary-layer estimates:

$$u_{e(n+1)} = u_{e(n)} - \frac{1}{\sqrt{M_{ei}^2 - 1}} (v_{w(n+1)} - v_{w(n)}). \qquad \text{Equation 9}$$

In some cases the matrices $d_{i,j}$ and $b_{i,j}$ can be adapted row by row to implement either the subsonic or supersonic interaction law depending on the local Mach number. Near Mach 1.0, the interaction laws may not work. The fluid flow is extremely nonlinear and a simple interaction law cannot predict the flow behavior. A reasonable work-around is to instead utilize a linear weighted average of the subsonic and supersonic interaction laws to approximate the changes to the inviscid fluid flow very close to Mach 1.0. For example, the following formula can be used to create a compressible influence coefficient that works from subsonic to supersonic flows, with linear weighted averaging as described below:

$$b_{comp\ ij} = (1-w_i)\frac{1}{\sqrt{1-M_i^2}}b_{ij} - w_i\frac{\delta_{ij}}{\sqrt{M_i^2-1}}, \qquad \text{Equation 10}$$

where $b_{comp\ ij}$ is the compressible influence coefficient matrix that can be used directly in equation 7 in the place of $b_{i,j}$. The compressible influence coefficient matrix $b_{comp\ ij}$ can allow equation 7 to be applicable for subsonic, transonic and supersonic flows. $b_{i,j}$ is the incompressible influence coefficient matrix derived from the linear surface panel technique, as described above. Here, $\delta_{ij}$ represents the Kroneker delta function (not to be confused with the displacement thickness $\delta^*$) which is simply notation describing that the right-hand term in the above equation only applies to the diagonal elements of the matrix. $M_i$ is again the sweep-normal local Mach number at the streamwise station i, except that in the left-hand term of the above equation, $M_i$ is capped above at the value of 0.97 and the value of $M_i$ in the right-hand term is capped below at the value of 1.03. The value of $w_i$ is zero when the actual $M_i$ is less than 0.97, $w_i$ is one when the actual $M_i$ is greater than 1.03, and $w_i$ varies linearly between zero and one when the actual $M_i$ lies between 0.97 and 1.03. An analogous technique can be performed with $d_{i,j}$ to make equation 5 applicable from subsonic through supersonic flows.

The interaction laws discussed above are particularly well suited for approximating inviscid fluid-flow conditions around a computer-generated wing surface. Other aircraft surfaces, such as fuselage-like bodies, including nacelles and fuel tanks may require different interaction laws. For example, the interaction law for subsonic flow around a fuselage-like body may consist of an axisymmetric panel code.

The axisymmetric panel code, which approximates the fuselage-like body as a locally axisymmetric body, may use a ring-source of constant strength, such as that described by Hess and Smith and Lewis. See Hess, J. L. and Smith, A. M. O., "Calculation of potential flow about arbitrary bodies," *Progress in Aerospace Sciences*, pp. 1-138, 1967 and Lewis, R. I., "Vortex element methods for fluid dynamic analysis of engineering systems," Cambridge University Press, 2005. This implementation differs from the two-dimensional interaction law in that there are no vortex elements. Both the shape of the body and the extra displacement thickness due to the boundary layer are accounted for by the ring-source elements.

Additionally, the interaction laws discussed above can be further adapted to account for other physical phenomenon, such as the so-called curvature correction. Typically, a boundary layer is assumed to be very thin and the outer inviscid fluid solution (determined using, for example, equation 13) can be approximated as constant between the actual edge of the boundary layer and the surface of the aircraft geometry. However, in regions of strong streamwise curvature of the boundary-layer edge, when, at the same time, the boundary layer is relatively thick (such as near wing trailing edges), the inviscid fluid solution may vary by a discernable amount between the boundary-layer edge and the aircraft surface. In this case, a curvature correction can be used to approximate this effect and to improve the accuracy of the interaction law. If the streamwise geometric curvature of the aircraft surface is $k_w$, then the curvature k of a fluid-flow streamline at the boundary-layer edge may be approximated by:

$$k = k_w + \left(\frac{1}{u_e}\right)\left(\frac{dv_w}{ds}\right). \qquad \text{Equation 11}$$

The curvature k induces a difference between the velocity at the surface $u_w$ (computed using the inviscid CFD simulation module) and the velocity at the boundary-layer edge $u_e$ which may be approximated by:

$$u_e - u_w = ku_e(\theta + \delta^*), \qquad \text{Equation 12}$$

where $\theta$ is the momentum thickness and $\delta^*$ the displacement thickness. The relation in equation 12 may be added to equation 1 to improve the accuracy of the method.

3. Inviscid and Viscous Fluid-Flow Meshing Techniques

As discussed above, a computer-generated simulation may represent a fluid flow using a mesh of fluid cells. The size and shape of the fluid cells can vary depending on the type of fluid-flow mesh used. In the examples provided below, inviscid regions of the fluid flow (typically away from the aircraft surface) are represented using a fluid-flow mesh of three-dimensional, cuboid fluid cells. Viscous regions of the fluid flow (typically near the surface of the aircraft) are represented using a fluid-flow mesh of boundary-layer fluid cells near the computer-generated aircraft surface. In some cases, the boundary-layer fluid-flow mesh is a two-dimensional mesh of fluid cells, each fluid cell comprising a single point or two-dimensional area.

FIG. 4 depicts a cross-sectional view of an inviscid fluid-flow mesh 402 of inviscid fluid cells and a viscous fluid-flow mesh 404 of boundary-layer fluid cells, both fluid-flow meshes represented as structured meshes. While the cross-sectional view of FIG. 4 depicts the fluid cells as areas, the fluid cells in this example are actually three-dimensional volumes.

FIG. 4 also depicts a surface mesh 406 of quadrilateral polygons representing the surface of a wing. The surface mesh 406 should approximate the curvilinear shape of the wing surface without creating gaps or breaks between quadrilateral polygons. In some cases, the surface mesh 406 of polygons can be used to define a set of fluid cells, each fluid cell comprising a single point or two-dimensional area. For example, the centroid of one or more of surface mesh polygons can be used to define one or more fluid cells.

The inviscid fluid-flow mesh 402 and viscous fluid-flow mesh 404 shown in FIG. 4 are shown as structured fluid-flow meshes defined using a set of vertices of the surface mesh 406. For a set of four adjacent vertices on the surface mesh 406, a volume 410 is projected from the surface of the wing in a direction as close to a surface normal as possible. The volume is partitioned into fluid cells 408 by defining at least two surfaces 412 that offset a given distance from the surface of the wing.

FIG. 5 depicts another technique for creating surface and fluid-flow meshes. In FIG. 5, the inviscid fluid-flow mesh 502 is depicted as being a Cartesian mesh. A Cartesian mesh is defined as a mesh of cube or rectangular cuboid fluid cells 508. That is, each fluid cell 508 is bounded by six flat faces where opposite faces are parallel and adjacent faces are orthogonal. In some cases, larger fluid cells are divided into smaller fluid cells by defining additional faces at the midpoint of the existing faces. Thus, the fluid cells in a Cartesian mesh can be different sizes.

FIG. 5 depicts one example of a boundary-layer fluid-flow mesh 504. This fluid-flow mesh can be created using a structured mesh as described above with respect to FIG. 4. Alternatively, the boundary-layer fluid-flow mesh 504 can be constructed as a Cartesian mesh similar to the inviscid fluid-flow mesh 502.

FIG. 5 also depicts a surface mesh 506 that is constructed using triangular mesh elements rather than quadrilateral mesh elements. In some cases, the surface mesh 506 of polygons can be used to define a set of fluid cells, each fluid cell comprising a single point or two-dimensional area. For example, the centroid of one or more surface mesh polygons can be used to define one or more fluid cells.

4. Field Equations for Simulating Fluid Flow Over a Computer-Generated Wing Surface As discussed above, a fluid flow can be simulated using both an inviscid and viscous CFD simulation modules to improve computing efficiency. The explanation below describes how the CFD simulation modules can be applied to different regions of fluid flow and provides exemplary field equations for simulating the dynamics of the fluid flow.

FIGS. 6a and 6b depict a cross-sectional representation of a fluid flow over a wing surface 602 classified by two regions: an outer region 604 and a boundary-layer region 606. Note that the boundary-layer region is drawn, for illustrative purposes, much thicker than a typical boundary-layer region on an aircraft wing. Also note that for internal flows, such as for flow through a pipe or aircraft engine inlet, the outer region is taken to be the region outside the boundary-layer region even though that region may be surrounded by geometric surfaces.

As shown in FIG. 6a, the outer region 604 may be located away from the wing surface 602. However, the outer region 604 may be close to the wing surface 602 in areas where the boundary-layer region 606 is thin or has yet to develop. See, for example, the portion of the fluid flow in FIG. 6a near the leading edge of the wing surface 602. The outer region 604 is usually characterized as having a relatively uniform velocity profile 612. When there is a relatively uniform velocity profile 612, internal shear forces acting on a fluid may be relatively small compared to internal forces, and therefore viscous contributions to the fluid dynamics can be minimized or ignored. Neglecting viscous effects in a fluid flow results in what is known as an inviscid flow.

A CFD simulation module that ignores viscous effects may also be called an inviscid CFD simulation module. Equation 13, below, provides an exemplary field equation for an inviscid CFD simulation module. Equation 13, also called the Euler's equation, represents the conservation of mass, conservation of three components of momentum, and conservation of energy:

$$\frac{\delta m}{\delta t} + \frac{\delta f_x}{\delta x} + \frac{\delta f_y}{\delta y} + \frac{\delta f_z}{\delta z} = 0; \quad \text{Equation 13}$$

where $$m = \begin{pmatrix} \rho \\ \rho u \\ \rho v \\ \rho w \\ E \end{pmatrix};$$

$$f_x = \begin{pmatrix} \rho u \\ p + \rho u^2 \\ \rho uv \\ \rho uw \\ u(E+p) \end{pmatrix};$$

$$f_y = \begin{pmatrix} \rho v \\ \rho uv \\ p + \rho v^2 \\ \rho vw \\ v(E+p) \end{pmatrix};$$

$$f_z = \begin{pmatrix} \rho w \\ \rho uw \\ \rho vw \\ p + \rho w^2 \\ w(E+p) \end{pmatrix};$$

where, u, v, and w are components of the velocity vector, p is the pressure, $\rho$ is the density, and E is the total energy-per-unit volume. Combining equation 13 with an equation of state (e.g., the ideal gas law), an inviscid CFD simulation module can predict the fluid properties for the inviscid outer region 604.

FIGS. 6a and 6b also depict a boundary-layer region 606, located near a wing surface 602. The boundary-layer region 606 is typically characterized by a sharply increasing velocity profile 608. Skin friction causes the velocity of the fluid flow very close to the wing surface to be essentially zero, with respect to the surface. A sharply increasing velocity profile 608 develops as the velocity increases from a near-zero velocity to the free-stream velocity. The sharply increasing velocity profile 608 in the boundary-layer region 606 creates shear forces within the boundary-layer region 606. Due to the internal shear forces, viscous properties of the fluid influence fluid flow in the boundary-layer region 606. Therefore, a simulation of the fluid flow in the boundary-layer region 606 must account for viscous contributions to the flow dynamics. In some cases, the fluid flow in boundary-layer region 606 may be characterized as turbulent flow (region 610). Due to fluid vorticity, viscous properties of the fluid influence the fluid flow. Thus, a simulation of the turbulent flow should also account for viscous contributions to the flow dynamics. For purposes of this discussion, laminar and turbulent regions are treated as one boundary-layer region and simulated using a single CFD simulation module.

A CFD simulation module that accounts for viscosity may also be called a viscous CFD simulation module or a boundary-layer CFD simulation module. Exemplary equations for three-dimensional boundary-layer flow are:

$$\frac{\partial \rho u}{\partial x} + \frac{\partial \rho v}{\partial y} + \frac{\partial \rho w}{\partial z} = 0; \quad \text{Equation 14}$$

$$\rho\left(u\frac{\partial}{\partial x} + v\frac{\partial}{\partial y} + w\frac{\partial}{\partial z}\right)u = -\frac{\partial p}{\partial x} + \frac{\partial}{\partial y}\left(\mu\frac{\partial u}{\partial y}\right); \quad \text{Equation 15}$$

$$\rho\left(u\frac{\partial}{\partial x} + v\frac{\partial}{\partial y} + w\frac{\partial}{\partial z}\right)w = -\frac{\partial p}{\partial z} + \frac{\partial}{\partial y}\left(\mu\frac{\partial w}{\partial y}\right); \quad \text{Equation 16}$$

-continued $$\rho c_p \left( u \frac{\partial}{\partial x} + v \frac{\partial}{\partial y} + w \frac{\partial}{\partial z} \right) T = \qquad \text{Equation 17}$$
$$u \frac{\partial p}{\partial x} + w \frac{\partial p}{\partial z} + \frac{\partial}{\partial y} \left( k \frac{\partial T}{\partial y} \right) + \mu \left[ \left( \frac{\partial u}{\partial y} \right)^2 + \left( \frac{\partial w}{\partial y} \right)^2 \right];$$

where $c_p$ is the specific heat at constant pressure, $\mu$ is the dynamic viscosity, k is the thermal conductivity, and T is the temperature. Often, the boundary-layer equations are further simplified, for instance by the sweep/taper theory where certain derivatives in the spanwise direction can be neglected or approximated, allowing a three-dimensional boundary-layer solution to be obtained on a two-dimensional curved computational mesh. Another simplification is to integrate out the details of the flow perpendicular to the surface of the airplane, resulting in an integral boundary-layer method, further described below with respect to equations 18 and 19.

Below, exemplary field equations for a two-dimensional integral boundary-layer CFD simulation module are provided according to a Drela boundary-layer technique. Drela, M. "XFOIL: An Analysis and Design System for Low Reynolds Number Airfoils," pp. 1-12, Proceedings of the Conference on Low Reynolds Number Aerodynamics (T. J. Mueller ed., Univ. of Notre Dame, Notre Dame, Ind., 1989).

Equation 18, below, represents a boundary-layer integral momentum equation for compressible flow:

$$\frac{d\theta}{dx} + (2 + H - M_e^2) \frac{\theta}{u_e} \frac{du_e}{dx} = \frac{C_f}{2}, \qquad \text{Equation 18}$$

where $\theta$ is the momentum thickness, H is the shape factor, $M_e$ is the boundary-layer edge Mach number, $u_e$ is the boundary-layer edge velocity, and $C_f$ is the skin friction coefficient.

Equation 19, below, represents a boundary-layer kinetic energy integral equation:

$$\theta \frac{dH^*}{dx} + (2H^{**} + H^*(1 - H)) \frac{\theta}{u_e} \frac{du_e}{dx} = 2C_D - H^* \frac{C_f}{2}. \qquad \text{Equation 19}$$

As used in equations 18 and 19, above, shape factors H, H*, and H** are defined as:

$$H = \frac{\delta^*}{\theta} \; H^* = \frac{\theta^*}{\theta} \; H^{} = \frac{\delta^{}}{\theta};$$

displacement thickness $\delta^*$ is defined as:

$$\delta^* = \int_0^\infty \left( 1 - \frac{\rho u}{\rho_e u_e} \right) dy;$$

momentum thickness $\theta$ is defined as:

$$\theta = \int_0^\infty \left( 1 - \frac{u}{u_e} \right) \frac{\rho u}{\rho_e u_e} dy;$$

kinetic energy thickness $\theta^*$ is defined as:

$$\theta^* = \int_0^\infty \left( 1 - \left( \frac{u}{u_e} \right)^2 \right) \frac{\rho u}{\rho_e u_e} dy;$$

density thickness $\delta^{**}$ is defined as:

$$\delta^{**} = \int_0^\infty \left( 1 - \frac{\rho}{\rho_e} \right) \frac{u}{u_e} dy;$$

skin friction coefficient $C_f$ is defined as:

$$C_f = \frac{\tau}{\frac{1}{2} \rho_e u_e^2};$$

and dissipation coefficient $C_D$ is defined as:

$$C_D = \frac{1}{\rho_e u_e^3} \int_0^\infty \tau \frac{\partial u}{\partial y} dy.$$

Given the local velocity u, solving equations 18 and 19 for local displacement thickness $\delta^*$ and momentum thickness $\theta$, the boundary-layer CFD simulation module can predict the fluid properties for portions of the fluid flow within the boundary-layer region 606. This is the direct-mode simulation. Alternatively, the inverse-mode solution takes displacement thickness $\delta^*$ as input and solves for local momentum thickness $\theta$ and local velocity u. Additional characteristics of the boundary layer, including boundary-layer thickness, can also be determined once the fluid properties are known.

In some cases, the boundary-layer CFD simulation module returns a transpiration flux value or transpiration velocity value representative of a boundary-layer region having a predicted thickness. A transpiration flux is a fictitious fluid flow into or out of the computer-generated aircraft surface. The transpiration flux displaces a portion of the outer region 604 in the same way as would the presence of a boundary layer having a predicted thickness. Using transpiration to represent the boundary layer may be more convenient. For instance, the inviscid CFD simulation module need only be modified where it calculates the surface boundary flow. It also allows the boundary-layer region to be discretized using a set of boundary-layer prediction points instead of using small volumes. In general, as the magnitude of the transpiration flux increases, the fictitious fluid flow increases, simulating a thickening boundary layer. In some cases, the transpiration flux can be used to create a fictitious flow of air into the aircraft surface (negative flux), thereby simulating a boundary layer having a reducing thickness.

The transpiration flux can be determined using the output of the Drela boundary-layer technique described in equations 18 and 19, above. For example, the transpiration flow velocity $v_w$ of the transpiration flux can be determined using:

$$v_w = \frac{1}{\rho_e} \frac{d}{ds} (\rho_e u_e \delta^*), \qquad \text{Equation 20}$$

where $\rho_e$ is the density of the fluid flow at the boundary-layer edge, $u_e$ is the velocity of the fluid flow at boundary-layer edge, $\delta^*$ is the computed boundary-layer displacement thickness, and s is an arc length along the computer-generated aircraft surface. In some cases, the arc length s is the average distance between boundary-layer prediction points on the computer-generated aircraft surface. Equation 20 is taken from Lock, R. C., and Williams, B. R., "Viscous-Inviscid Interactions in External Aerodynamics," Prog. Aerospace Sci., Vol. 24, 1987, pp. 51-171. Thus, the transpiration mass flux (density $\rho_e$ times the transpiration flow velocity $v_w$) is equal to the rate of change of the product of the local density $\rho_e$, local velocity $u_e$, and boundary-layer displacement thickness $\delta^*$ along the solution strip. A finite difference method can be used to compute the derivative in equation 20. For example, neighboring boundary-layer prediction points along the surface of the computer-generated aircraft surface can be used with a second order, backward Lagrange polynomial formulation to compute the derivative values.

For the case of three-dimensional or sweep/taper boundary-layer flow solutions, there is an analog to equation 20 that has two terms on the right-hand side. The first term with the streamwise displacement thickness and the second with the crossflow displacement thickness.

The results of the inviscid CFD simulation module (using, for example, equation 13) are used by a viscous or boundary-layer CFD module (using, for example equations 18, 19, and 20) to predict the boundary-layer fluid properties for each boundary-layer prediction point. The boundary-layer fluid properties (e.g., boundary-layer thickness or transpiration flux) can then be used by the inviscid CFD simulation module to predict an updated or refined set of inviscid fluid property values. In this way, the inviscid and viscous CFD simulation modules can be used to iterate or refine the results of the computer-generated simulation.

5. Computer and Computer Network System

The embodiments described herein are typically implemented as computer software (computer-executable instructions) executed on a processor of a computer system. FIG. 7 depicts an exemplary computer system 700 configured to perform any one of the above-described processes. Computer system 700 may include the following hardware components: processor 702, data input devices (e.g., keyboard, mouse, keypad) 704, data output devices (e.g., network connection, data cable) 706, and user display (e.g., display monitor) 708. The computer system also includes non-transitory memory components including random access memory (RAM) 710, hard drive storage 712, and other computer-readable storage media 714.

Processor 702 is a computer processor capable of receiving and executing computer-executable instructions for performing any of the processes described above. Computer system 700 may include more than one processor for performing the processes. The computer-executable instructions may be stored on one or more types of non-transitory storage media including RAM 710, hard drive storage 712, or other computer-readable storage media 714. Other computer-readable storage media 714 include, for example, CD-ROM, DVD, magnetic tape storage, magnetic disk storage, solid-state storage, and the like.

Figure 8:
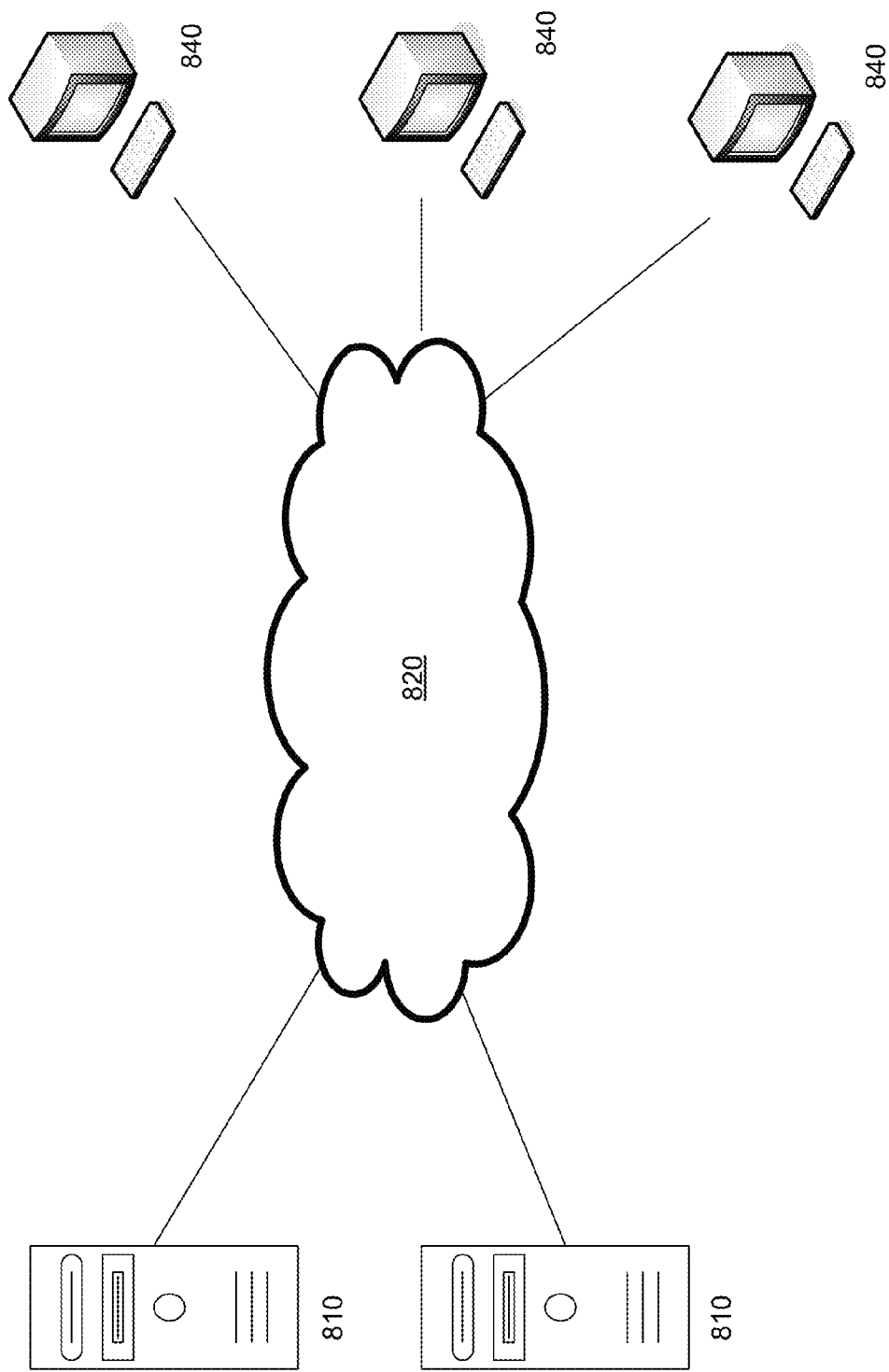
FIG. 8 depicts an exemplary computer network.

FIG. 8 depicts an exemplary computer network for distributing the processes described above to multiple computers at remote locations. One or more servers 810 may be used to perform portions of the process described above. For example, one or more servers 810 may store and execute computer-executable instructions for receiving information for generating a computer-generated simulation. The one or more servers 810 are specially adapted computer systems that are able receive input from multiple users in accordance with a web-based interface. The one or more servers 810 are able to communicate directly with one another using a computer network 820 including a local area network (LAN) or a wide area network (WAN), such as the Internet.

One or more client computer systems 840 provide an interface to one or more system users. The client computer systems 840 are capable of communicating with the one or more servers 810 over the computer network 820. In some embodiments, the client computer systems 840 are capable of running a web browser that interfaces with a web-enabled system running on one or mover server machines 810. The web browser is used for accepting input data from the user and presenting a display to the user in accordance with the exemplary user interface described above. The client computer 840 includes a computer monitor or other display device for presenting information to the user. Typically, the client computer 840 is a computer system in accordance with the computer system 700 depicted in FIG. 7.

Although the invention has been described in considerable detail with reference to certain embodiments thereof, other embodiments are possible, as will be understood by those skilled in the art.

We claim:

1. A computer-implemented method of generating a fluid-flow simulation over a computer-generated surface using one or more processors, the simulation including an inviscid fluid-flow mesh comprised of a plurality of inviscid fluid cells and a viscous fluid-flow mesh comprised of a plurality of boundary-layer fluid cells, at least some of the boundary-layer fluid cells being on or adjacent to the computer-generated surface, the method comprising:

determining, using the one or more processors, an initial fluid property, for at least one inviscid fluid cell using an inviscid fluid simulation that does not simulate fluid viscous effects;

determining, using the one or more processors, an initial boundary-layer fluid property for at least one of the boundary-layer fluid cells using the initial fluid property and a viscous fluid simulation that simulates fluid viscous effects, wherein the at least one inviscid fluid cell is located in relation to the at least one boundary-layer fluid cell such that an updated boundary-layer fluid property for the at least one boundary-layer fluid cell is influenced by the at least one inviscid fluid cell;

determining, using the one or more processors, the updated boundary-layer fluid property for the at least one boundary-layer fluid cell using the initial fluid property, initial boundary-layer fluid property, and an interaction law, wherein the interaction law approximates the inviscid fluid simulation using a matrix of aerodynamic influence coefficients computed using a two-dimensional surface panel technique and a fluid-property vector;

determining, using the one or more processors, an updated fluid property for the at least one inviscid fluid cell using the updated boundary-layer fluid property.

2. The computer-implemented method of claim 1, wherein the initial fluid property is an initial fluid velocity and the updated fluid property is an updated fluid velocity.

3. The computer-implemented method of claim 1, wherein the initial boundary-layer fluid property is an initial displacement thickness and the updated boundary-layer fluid property is an updated displacement thickness.

4. The computer-implemented method of claim 1, wherein the matrix of aerodynamic influence coefficients is adapted to account for compressibility by dividing each row by $(1-M_l^2)^{1/2}$, wherein $M_l$ is the local Mach number.

5. The computer-implemented method of claim 1, wherein a fluid property of the fluid property vector is determined using the following relation to simulate supersonic flow conditions:

$$u_{e(n+1)} = u_{e(n)} - \frac{1}{\sqrt{M_{ei}^2 - 1}}\left(\frac{dm_{(n)}}{ds} - \frac{dm_{(n+1)}}{ds}\right),$$

where $u_{e(n+1)}$ is the edge velocity at time step n+1, $u_{e(n)}$ is the edge velocity at time step n, $M_{ei}$ is the local Mach number, and $m_{(n)}$ and $m_{(n+1)}$ is the product of: edge density $\rho_e$, edge velocity $u_e$, and boundary-layer thickness $\delta^*$ at time step n and time step n+1, respectively.

6. The computer-implemented method of claim 1, wherein a fluid property of the fluid property vector is determined using the following relation to simulate supersonic flow conditions over a swept/tapered wing:

$$u_{e(n+1)} = u_{e(n)} - \frac{1}{\sqrt{M_{ei}^2 - 1}}(v_{w(n+1)} - v_{w(n)}),$$

where $u_{e(n+1)}$ is the edge velocity at time step n+1, $u_{e(n)}$ is the edge velocity at time step n, $M_{ei}$ is the local Mach number, and $v_{w(n+1)}$ and $v_{w(n)}$ are the transpiration velocities at the surface at time step n and time step n+1, respectively.

7. The computer-implemented method of claim 1, wherein the matrix of aerodynamic influence coefficients is adapted row-by-row to implement either the subsonic or supersonic interaction law depending on the local Mach number.

8. The computer-implemented method of claim 7, wherein the matrix of aerodynamic influence coefficients is further adapted to utilize a linear weighted average of the subsonic and supersonic interaction laws to approximate the changes to the inviscid fluid flow for local Mach numbers near Mach 1.

9. The computer-implemented method of claim 8, wherein the linear weighted average is used for local Mach numbers ranging between about 0.97 and about 1.03.

10. The computer-implemented method of claim 1, wherein the matrix of aerodynamic influence coefficients is adapted using a curvature correction to approximate a boundary layer characterized as having a thickness and a curvature.

11. The computer-implemented method of claim 1, wherein the interaction law approximates the inviscid fluid simulation using a matrix of aerodynamic influence coefficients computed using an axisymmetric surface panel technique instead of a two-dimensional surface panel technique.

12. The computer-implemented method of claim 1, wherein the computer-generated surface is a computer-generated wing surface of an aircraft.

13. A non-transitory computer-readable storage medium comprising computer-executable instructions for generating a fluid-flow simulation over a computer-generated surface, the simulation including an inviscid fluid-flow mesh comprised of a plurality of inviscid fluid cells and a viscous fluid-flow mesh comprised of a plurality of boundary-layer fluid cells, at least some of the boundary-layer fluid cells being on or adjacent to the computer-generated surface, the instructions for:

determining an initial fluid property, for at least one inviscid fluid cell using an inviscid fluid simulation that does not simulate fluid viscous effects;

determining an initial boundary-layer fluid property for at least one of the boundary-layer fluid cells using the initial fluid property and a viscous fluid simulation that simulates fluid viscous effects, wherein the at least one inviscid fluid cell is located in relation to the at least one boundary-layer fluid cell such that an updated boundary-layer fluid property for the at least one boundary-layer fluid cell is influenced by the at least one inviscid fluid cell;

determining the updated boundary-layer fluid property for the at least one boundary-layer fluid cell using the initial fluid property, initial boundary-layer fluid property, and an interaction law, wherein the interaction law approximates the inviscid fluid simulation using a matrix of aerodynamic influence coefficients computed using a two-dimensional surface panel technique and a fluid-property vector;

determining an updated fluid property for the at least one inviscid fluid cell using the updated boundary-layer fluid property.

14. The computer-readable medium of claim 13, wherein the initial fluid property is an initial fluid velocity and the updated fluid property is an updated fluid velocity.

15. The computer-readable medium of claim 13, wherein the initial boundary-layer fluid property is an initial displacement thickness and the updated boundary-layer fluid property is an updated displacement thickness.

16. The computer-readable medium of claim 13, wherein the matrix of aerodynamic influence coefficients is adapted to account for compressibility by dividing each row by $(1-M_l^2)^{1/2}$, wherein $M_l$ is the local Mach number.

17. The computer-readable medium of claim 13, wherein a fluid property of the fluid property vector is determined using the following relation to simulate supersonic flow conditions:

$$u_{e(n+1)} = u_{e(n)} - \frac{1}{\sqrt{M_{ei}^2 - 1}}\left(\frac{dm_{(n)}}{ds} - \frac{dm_{(n+1)}}{ds}\right),$$

where $u_{e(n+1)}$ is the edge velocity at time step n+1, $u_{e(n)}$ is the edge velocity at time step n, $M_{ei}$ is the local Mach number, and $m_{(n)}$ and $m_{(n+1)}$ is the product of: edge density $\rho_e$, edge velocity $u_e$, and boundary-layer thickness $\delta^*$ at time step n and time step n+1, respectively.

18. The computer-readable medium of claim 13, wherein a fluid property of the fluid property vector is determined using the following relation to simulate supersonic flow conditions over a swept/tapered wing:

$$u_{e(n+1)} = u_{e(n)} - \frac{1}{\sqrt{M_{ei}^2 - 1}}(v_{w(n+1)} - v_{w(n)}),$$

where $u_{e(n+1)}$ is the edge velocity at time step n+1, $u_{e(n)}$ is the edge velocity at time step n, $M_{ei}$ is the local Mach number, and $v_{w(n+1)}$ and $v_{w(n)}$ are the transpiration velocities at the surface at time step n and time step n+1, respectively.

19. The computer-readable medium of claim 13, wherein the matrix of aerodynamic influence coefficients is adapted row-by-row to implement either the subsonic or supersonic interaction law depending on the local Mach number.

20. The computer-readable medium of claim 19, wherein the matrix of aerodynamic influence coefficients is further adapted to utilize a linear weighted average of the subsonic and supersonic interaction laws to approximate the changes to the inviscid fluid flow for local Mach numbers near Mach 1.

21. The computer-readable medium of claim 20, wherein the linear weighted average is used for local Mach numbers ranging between about 0.97 and about 1.03.

22. The computer-readable medium of claim 13, wherein the matrix of aerodynamic influence coefficients is adapted using a curvature correction to approximate a boundary layer characterized as having a thickness and a curvature.

23. The computer-readable medium of claim 13, wherein the interaction law approximates the inviscid fluid simulation using a matrix of aerodynamic influence coefficients computed using an axisymmetric surface panel technique instead of a two-dimensional surface panel technique.

24. The computer-readable medium of claim 13, wherein the computer-generated surface is a computer-generated wing surface of an aircraft.

\* \* \* \* \*